April 11, 1950 H. W. EASTMAN 2,503,809
TAG APPLYING METHOD AND MACHINE
Filed Sept. 5, 1945 23 Sheets-Sheet 2

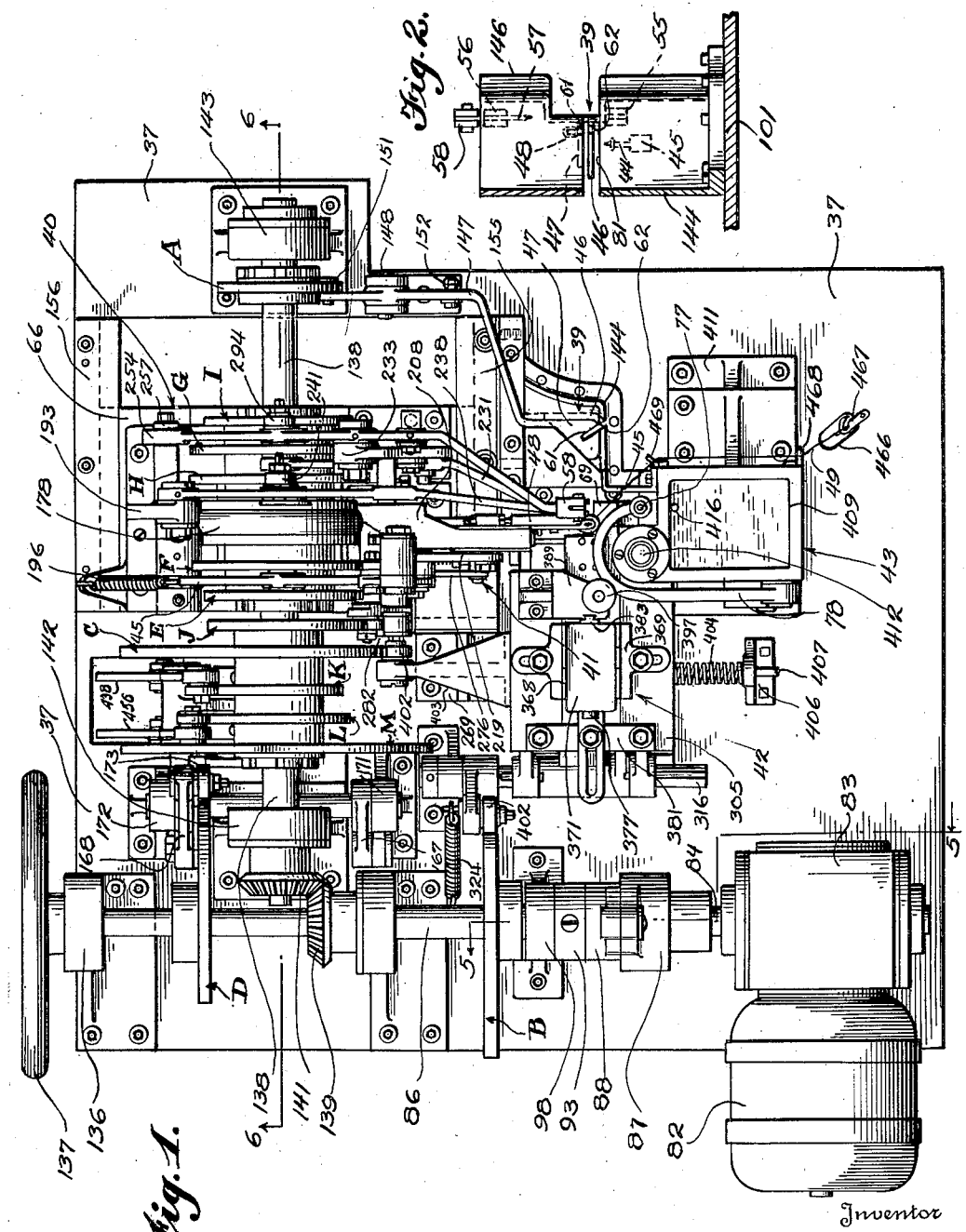

Inventor
Howard W. Eastman
By Bacon & Thomas
Attorneys

April 11, 1950     H. W. EASTMAN     2,503,809
TAG APPLYING METHOD AND MACHINE

Filed Sept. 5, 1945     23 Sheets-Sheet 5

Inventor
Howard W. Eastman
By Bacon & Thomas
Attorneys

April 11, 1950 H. W. EASTMAN 2,503,809
TAG APPLYING METHOD AND MACHINE
Filed Sept. 5, 1945 23 Sheets-Sheet 6

Inventor
Howard W. Eastman
By Bacon & Thomas
Attorneys

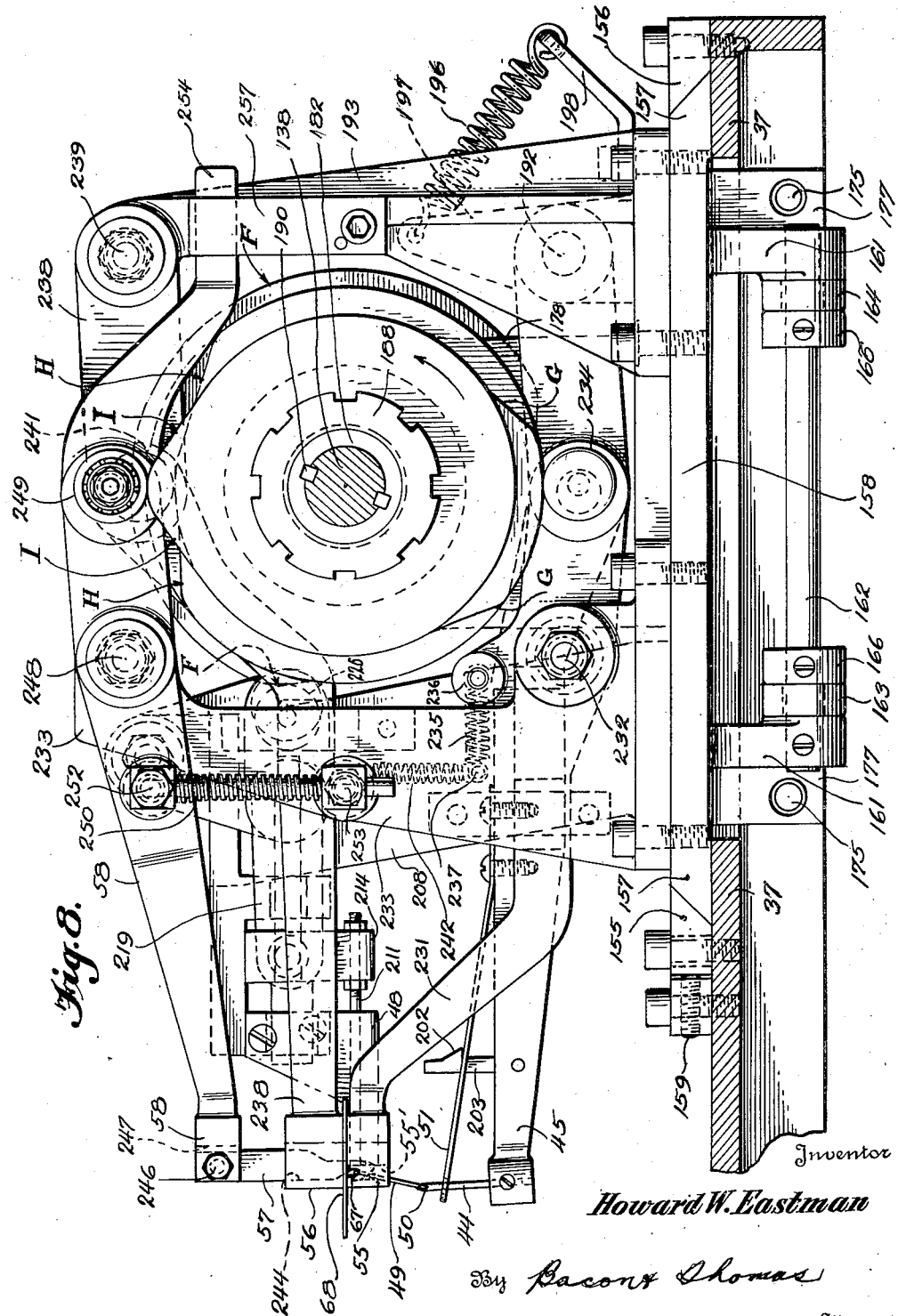

April 11, 1950  H. W. EASTMAN  2,503,809
TAG APPLYING METHOD AND MACHINE
Filed Sept. 5, 1945  23 Sheets-Sheet 8
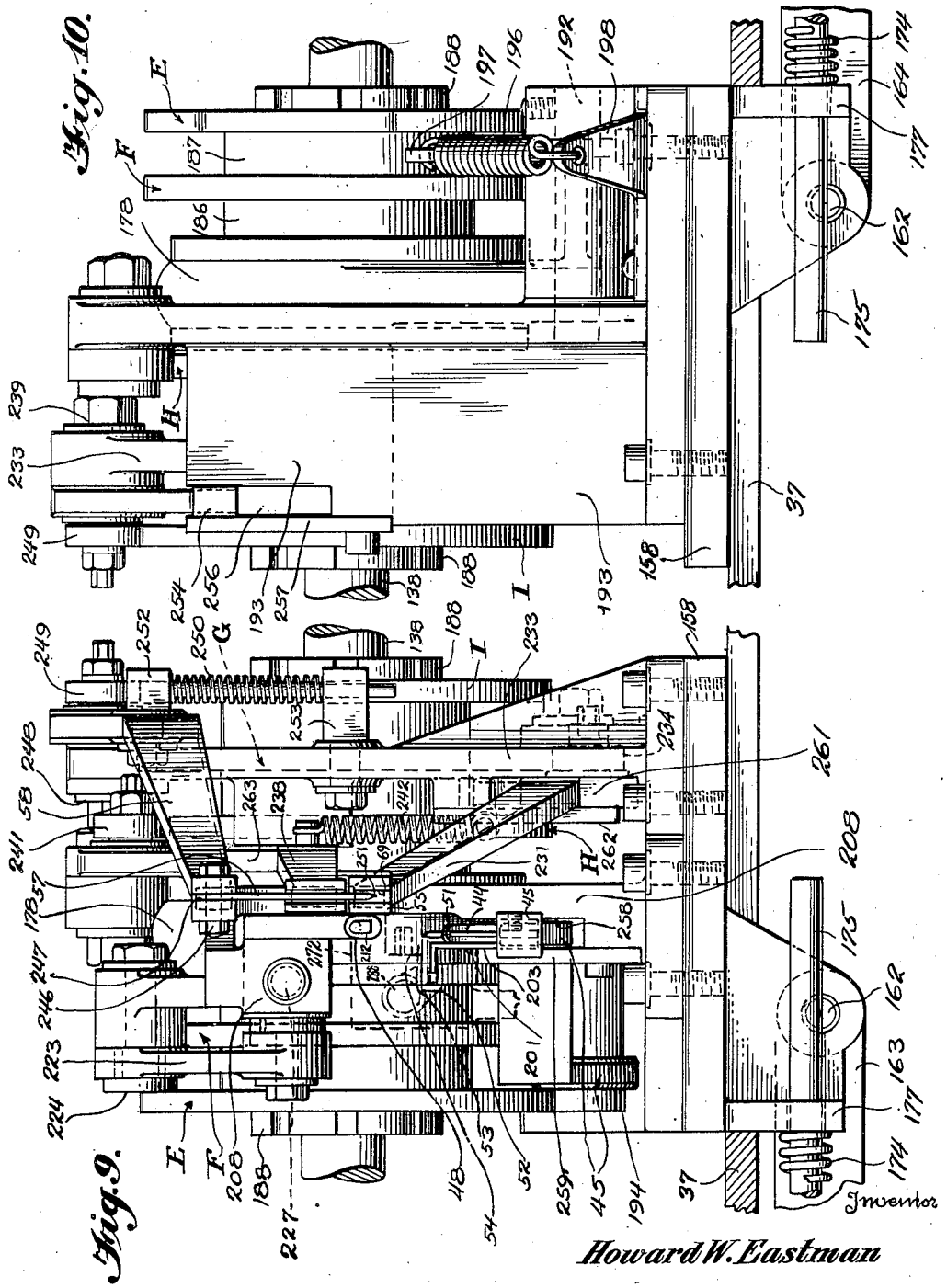
Inventor
Howard W. Eastman
By Bacon & Thomas
Attorneys

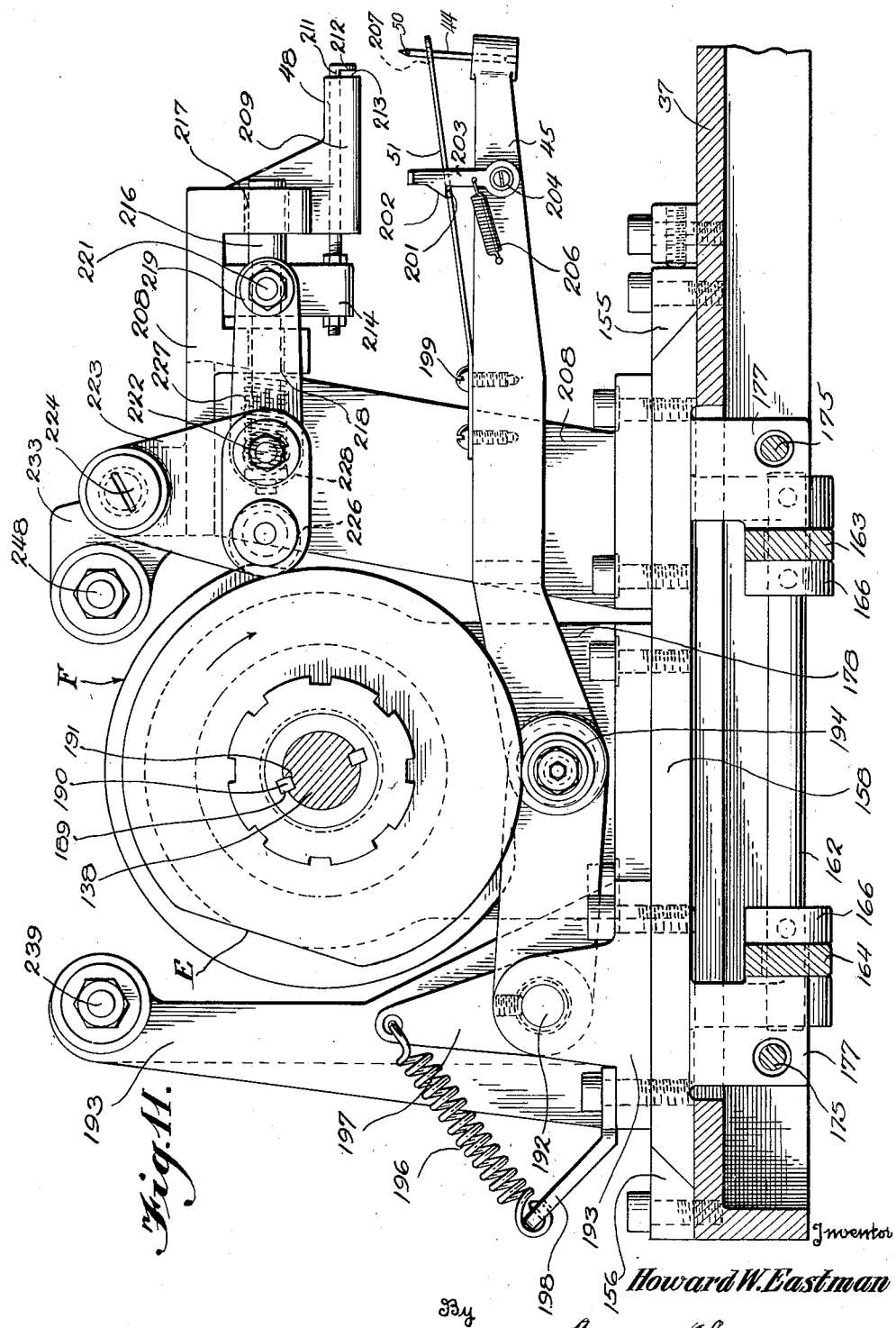

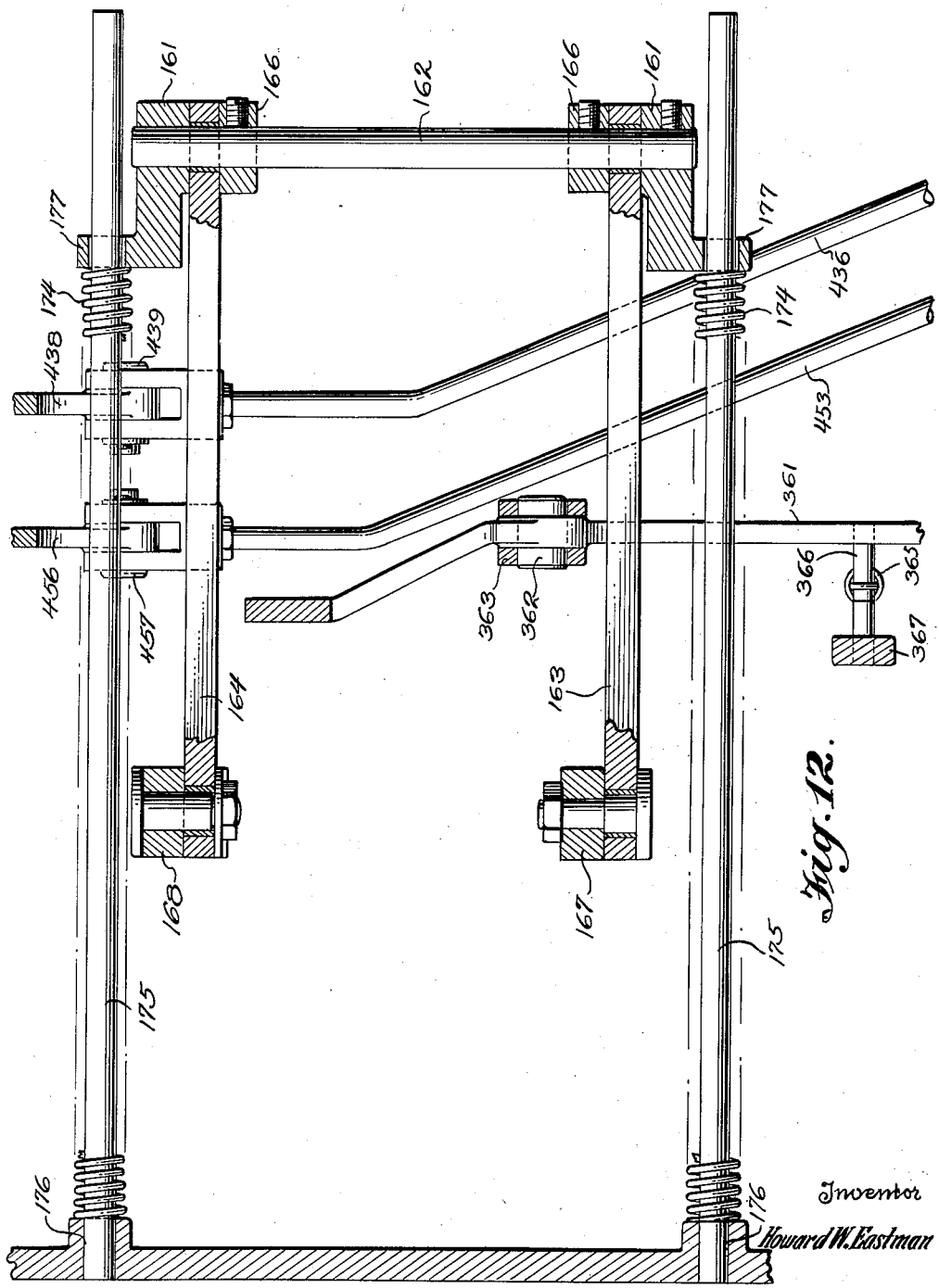

April 11, 1950          H. W. EASTMAN          2,503,809
TAG APPLYING METHOD AND MACHINE
Filed Sept. 5, 1945          23 Sheets-Sheet 11
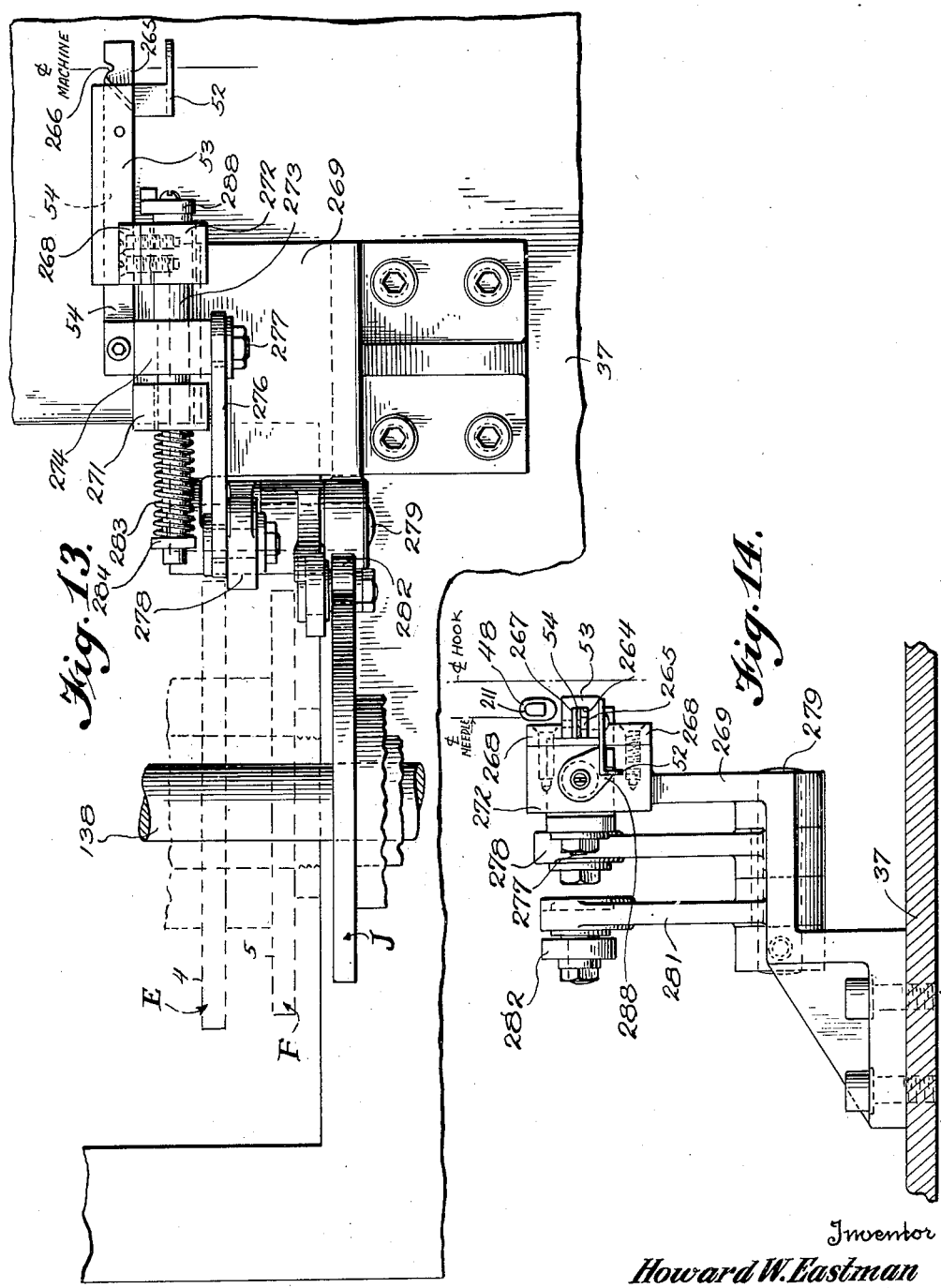
Inventor
Howard W. Eastman
By Bacon & Thomas
Attorneys

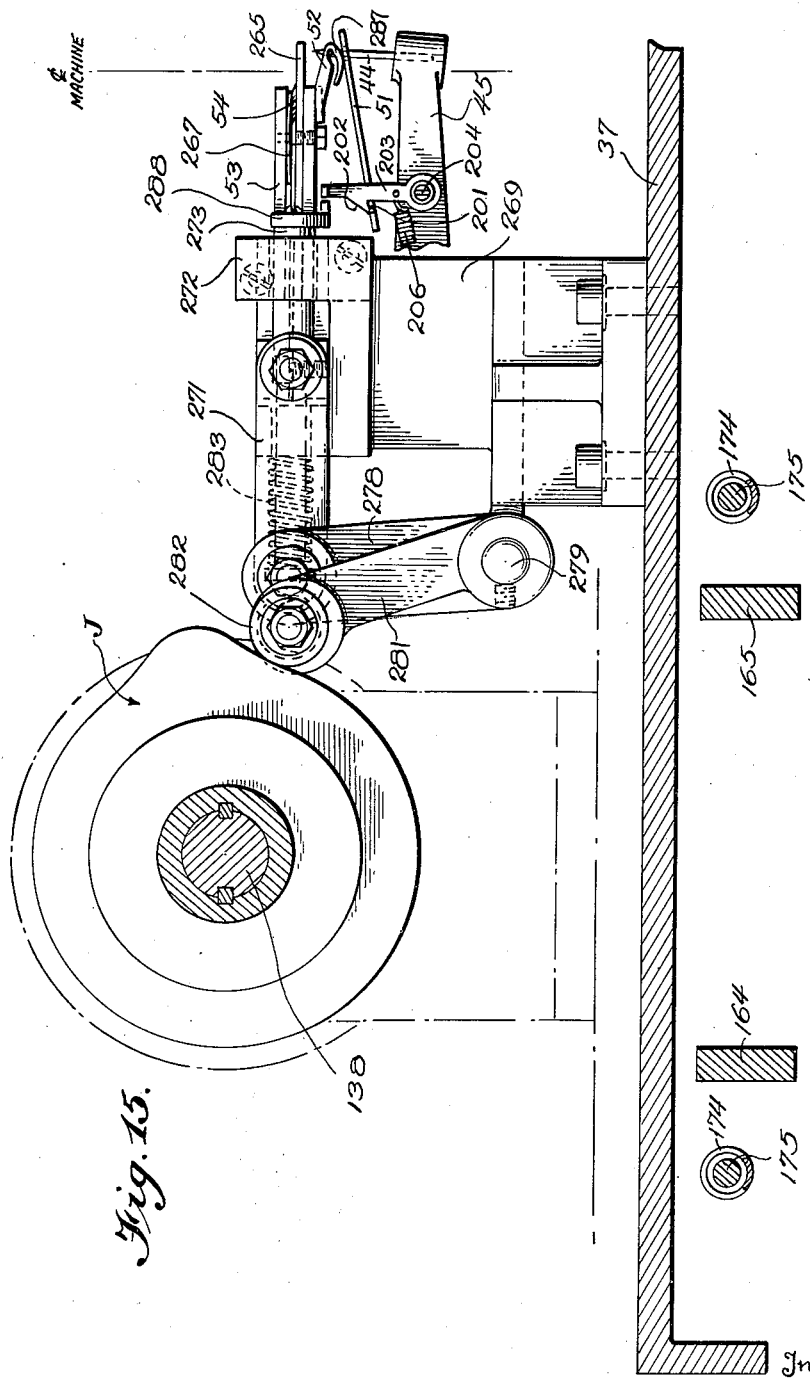

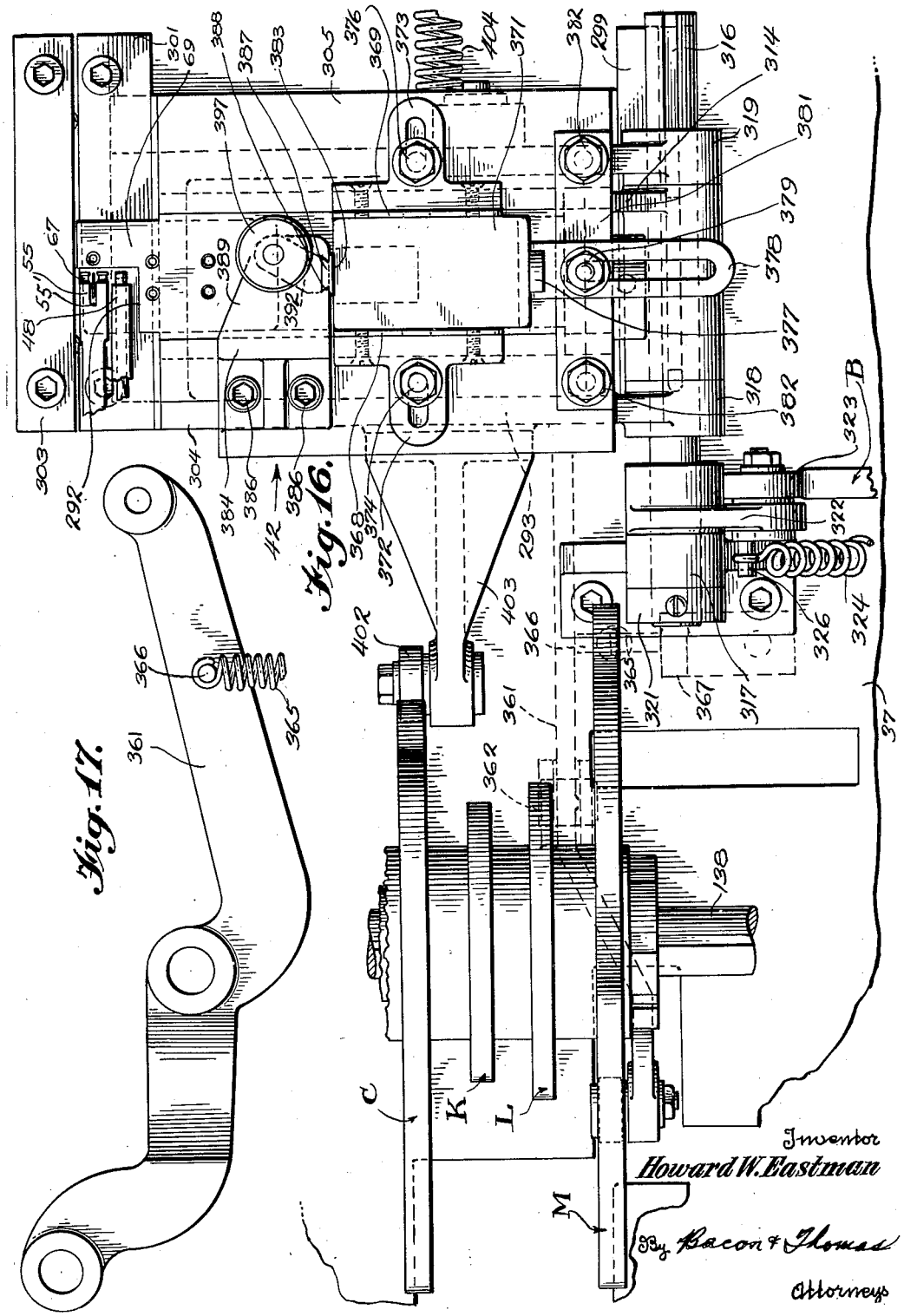

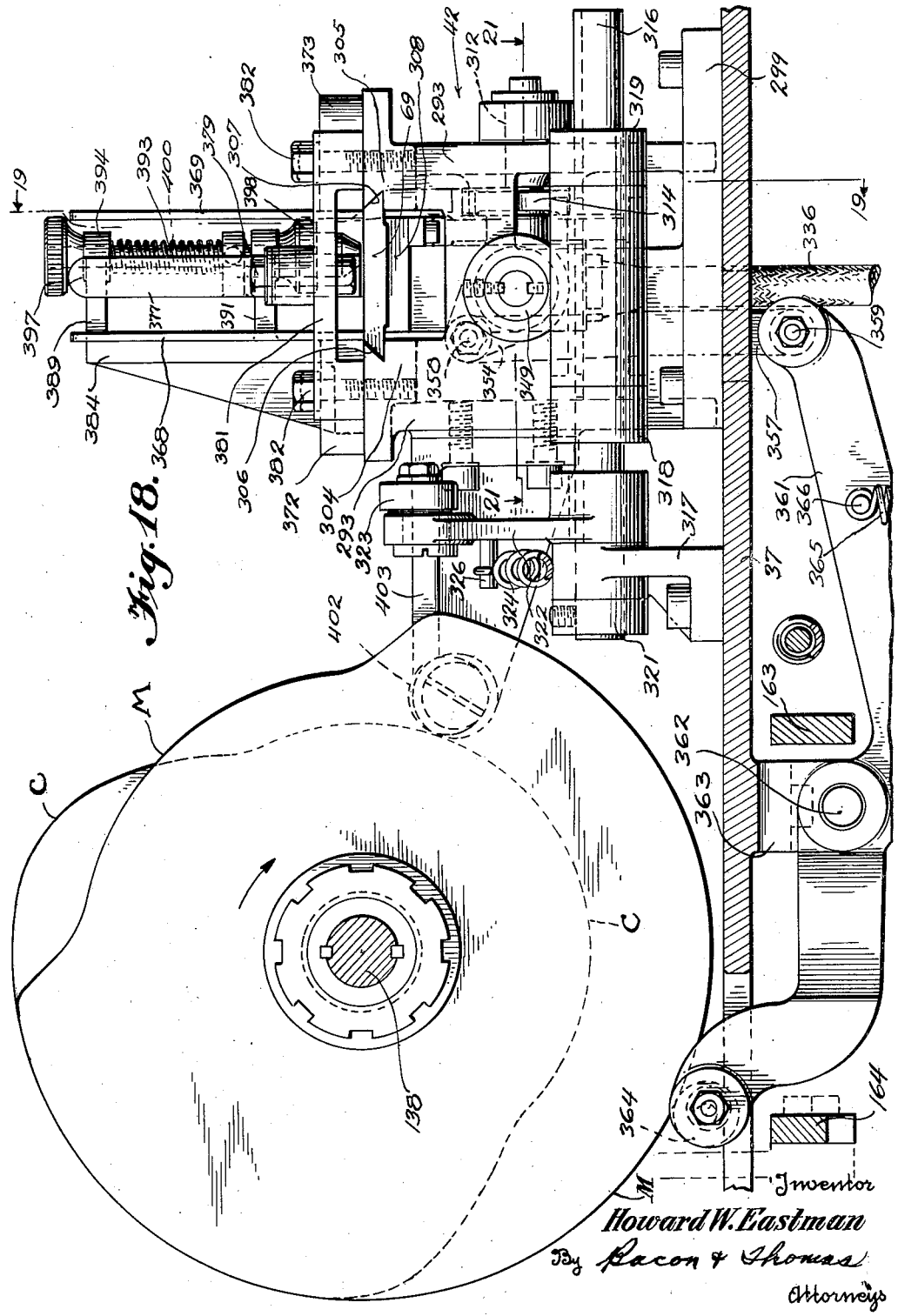

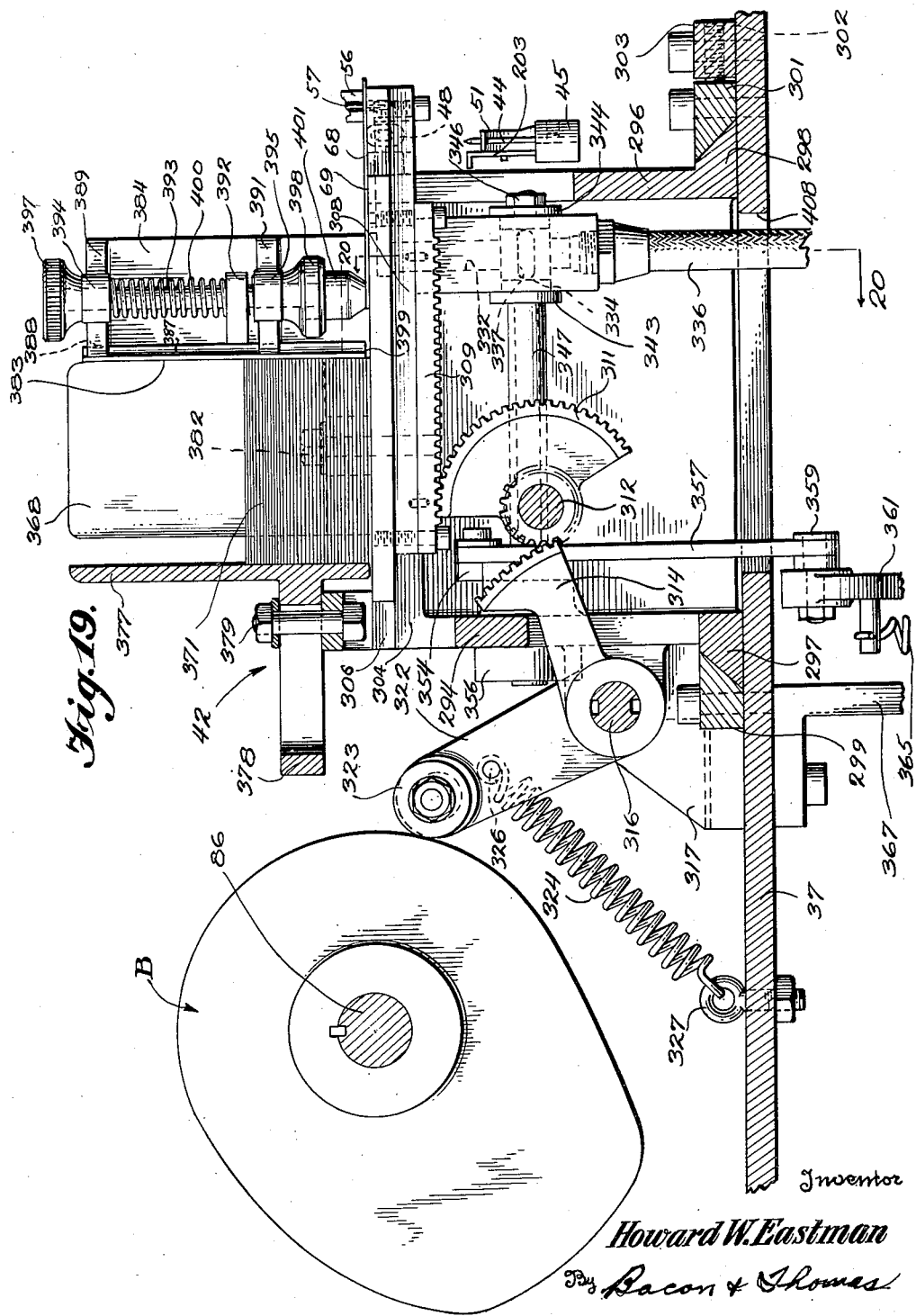

April 11, 1950     H. W. EASTMAN     2,503,809
TAG APPLYING METHOD AND MACHINE
Filed Sept. 5, 1945                              23 Sheets-Sheet 16
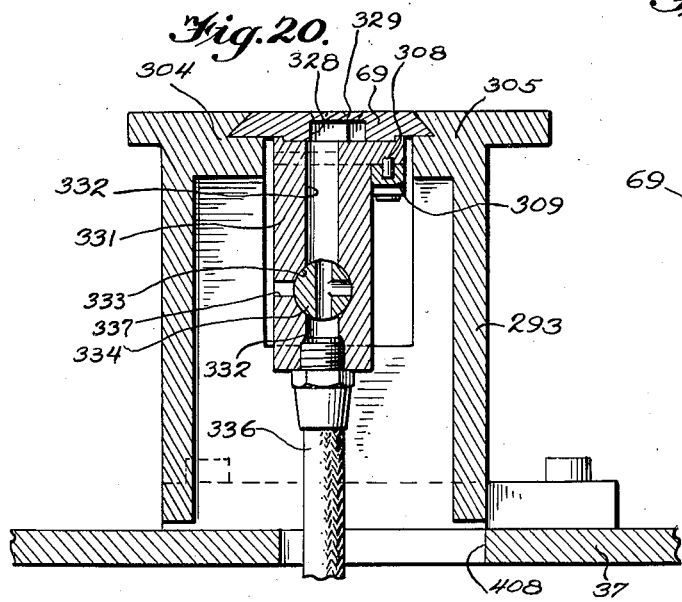
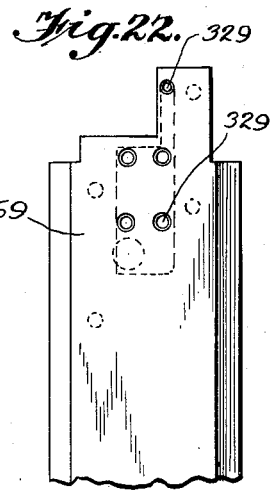
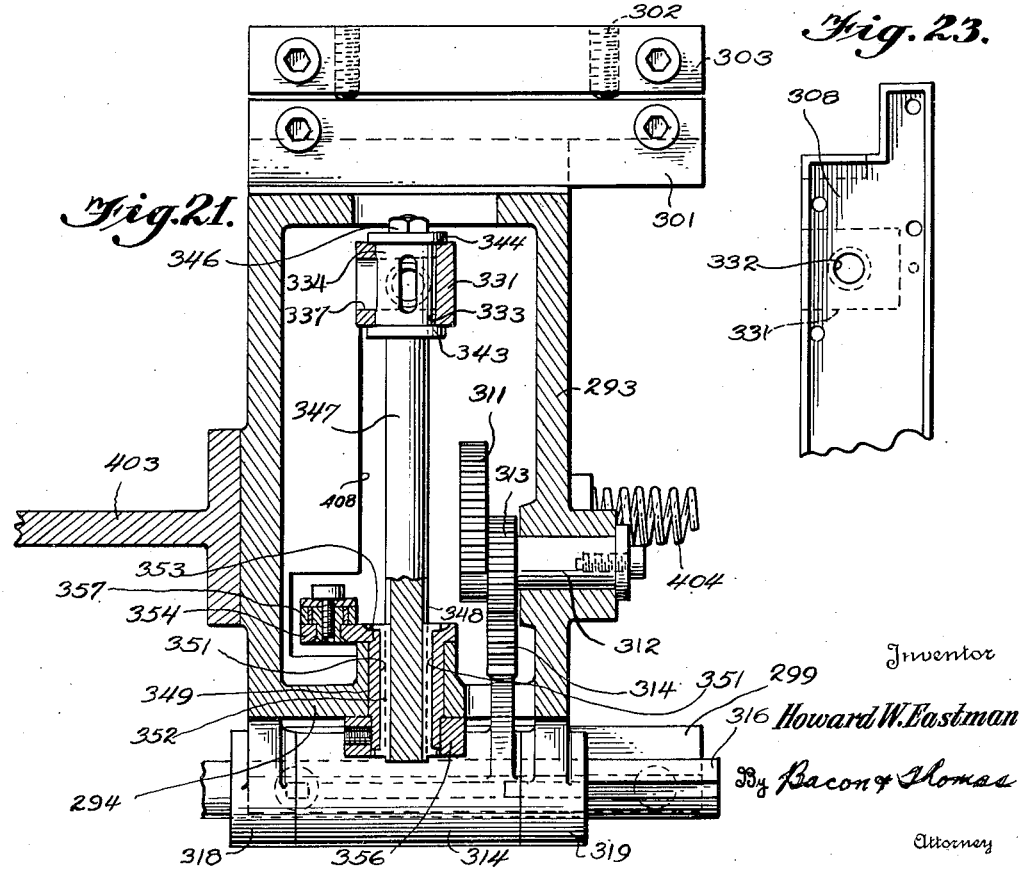
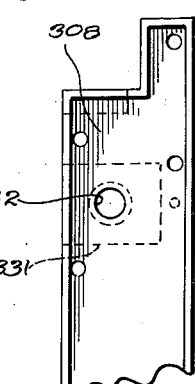
Inventor
Howard W. Eastman
By Bacon & Thomas
Attorney

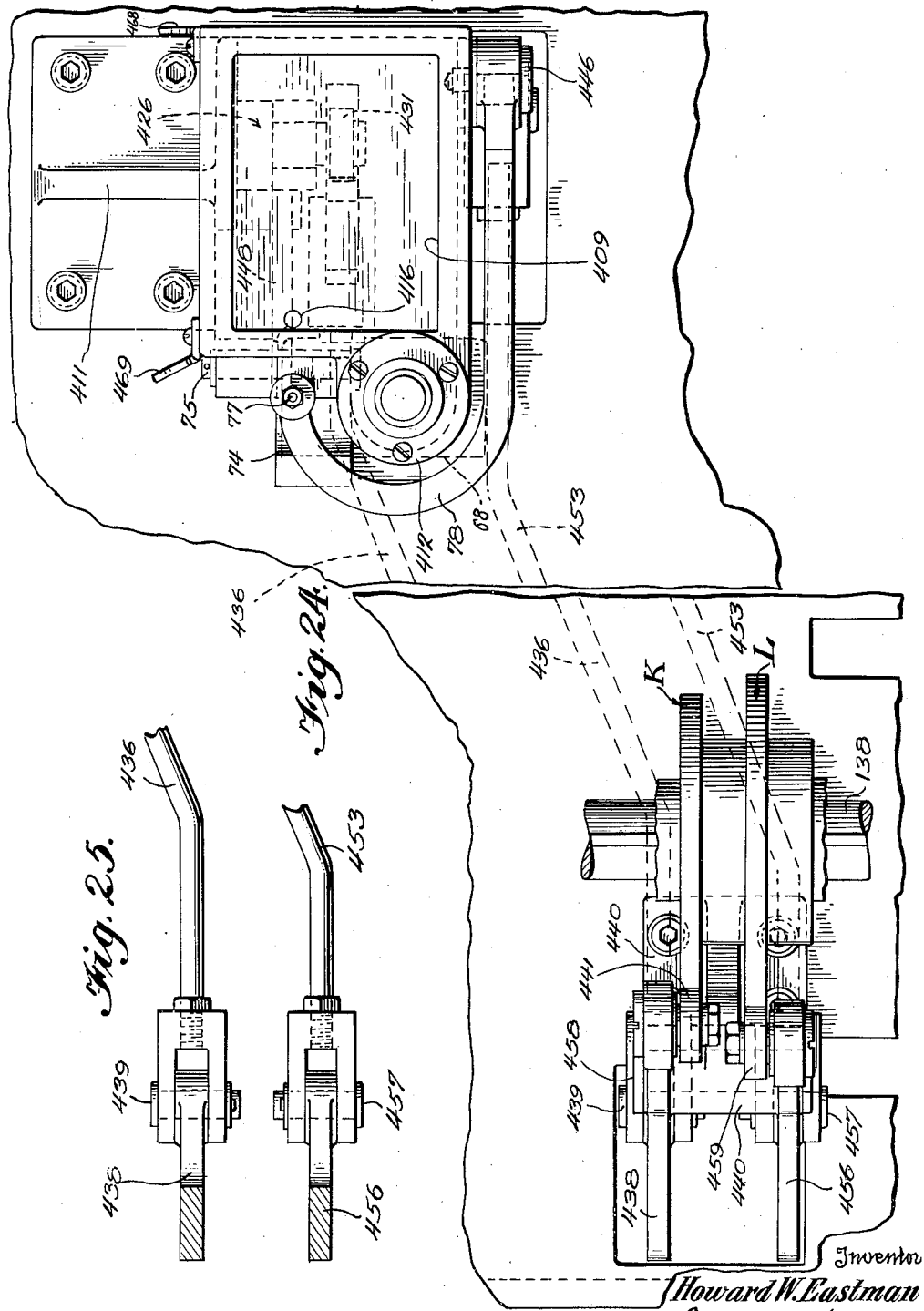

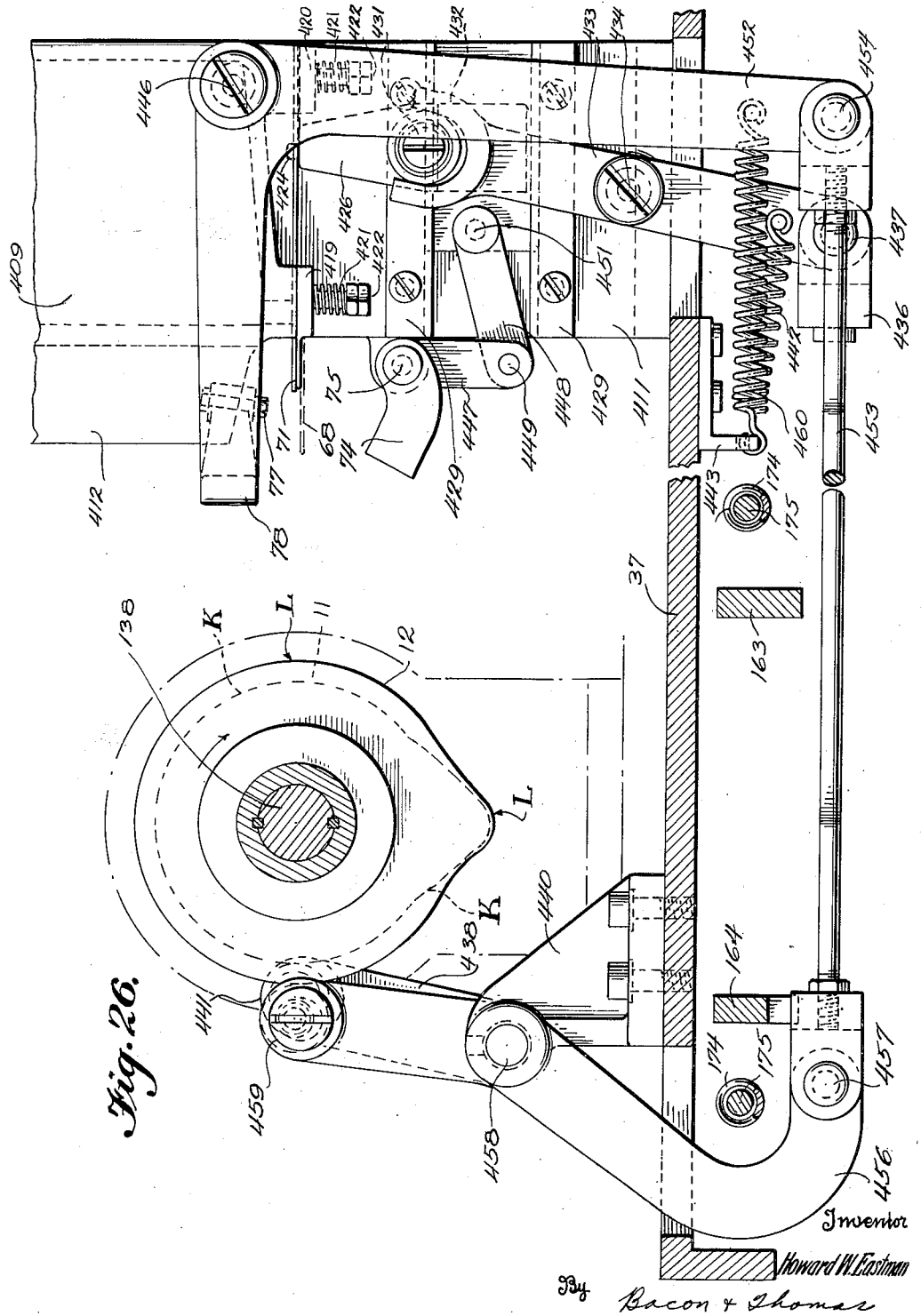

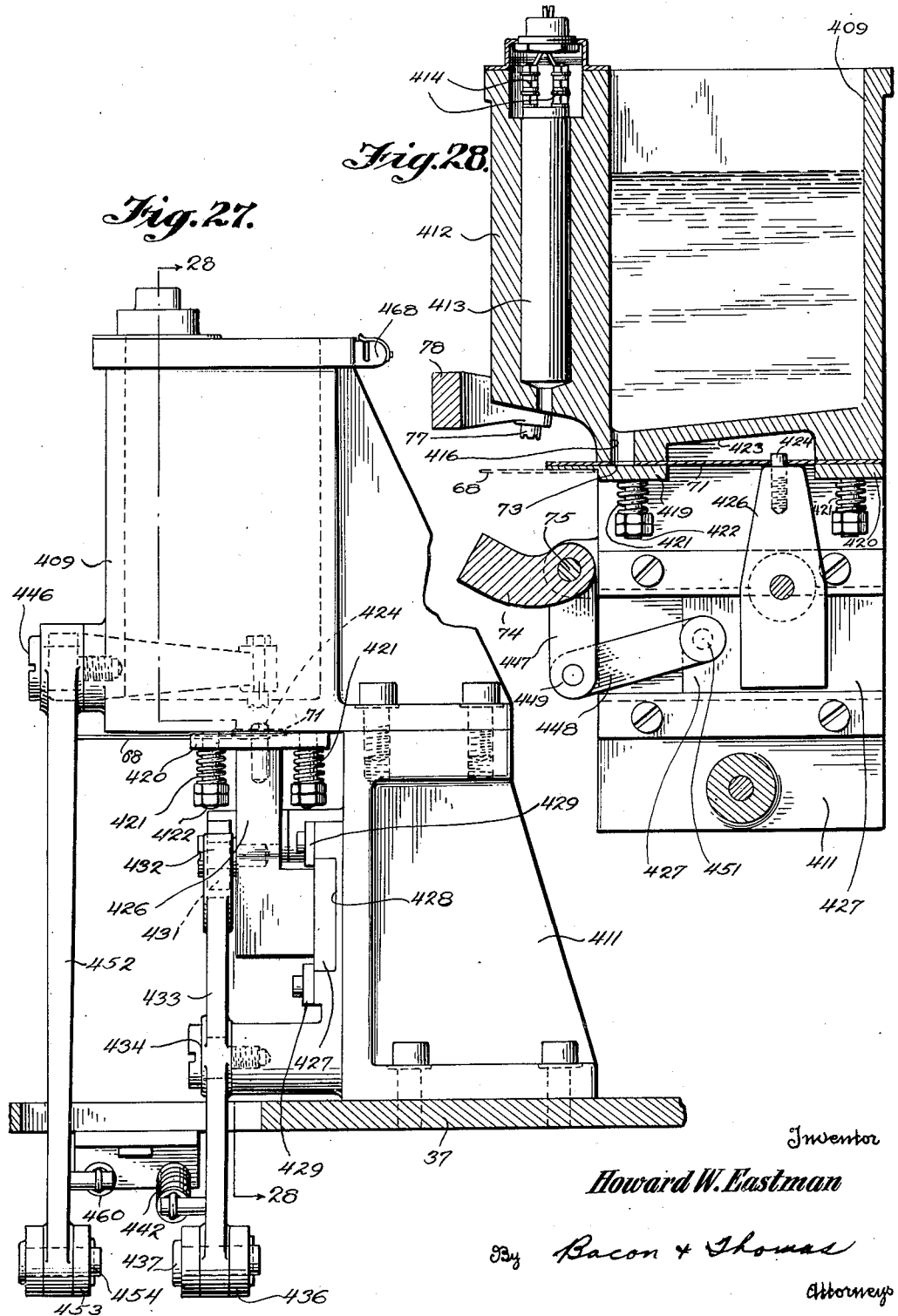

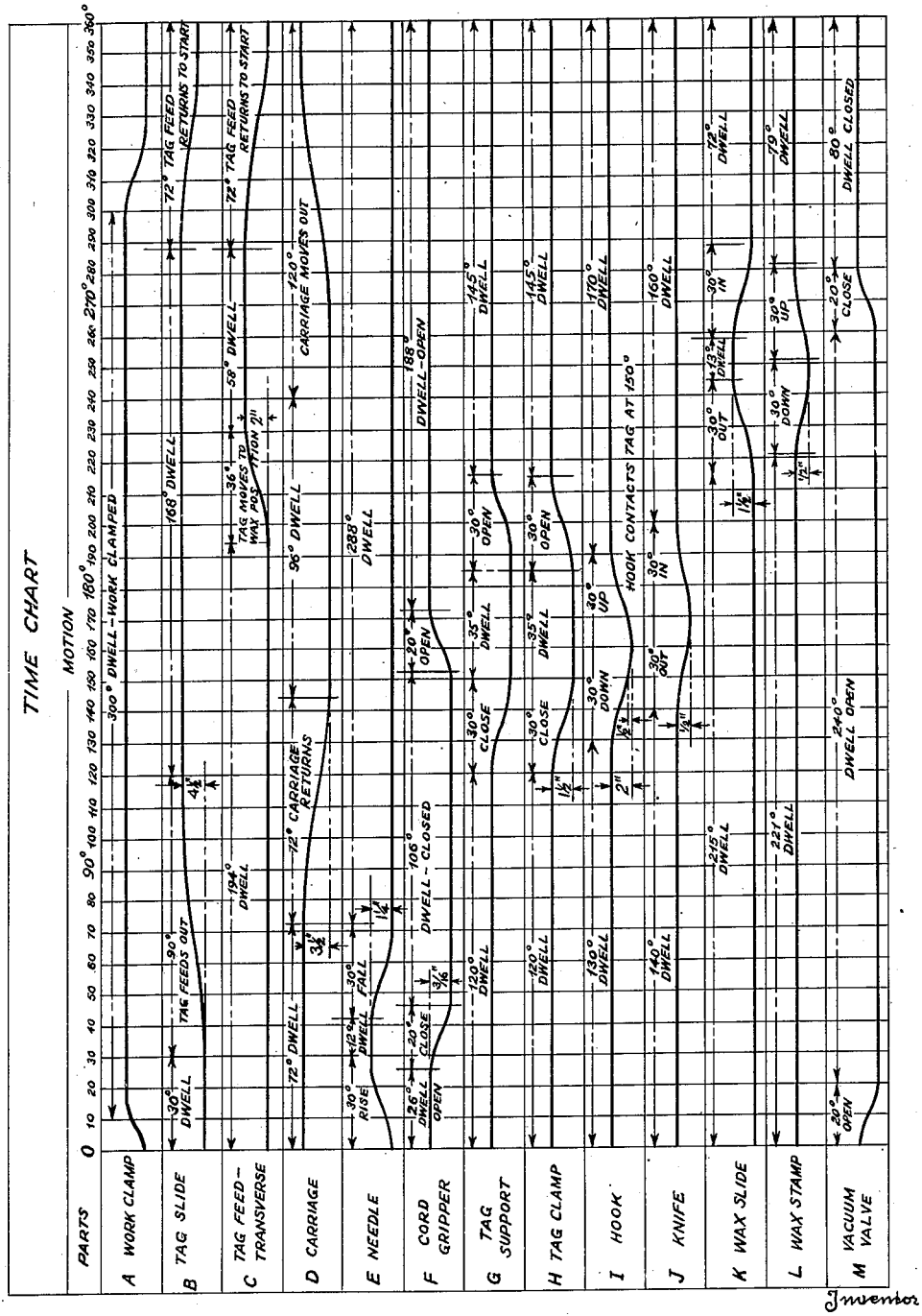

April 11, 1950     H. W. EASTMAN     2,503,809
TAG APPLYING METHOD AND MACHINE
Filed Sept. 5, 1945     23 Sheets—Sheet 21
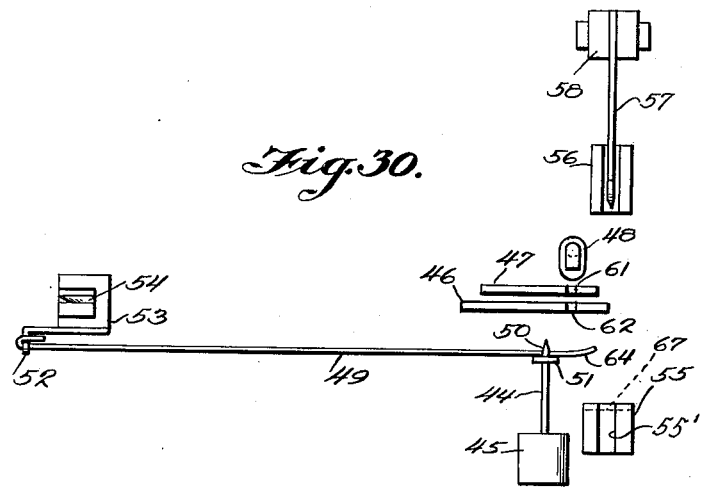
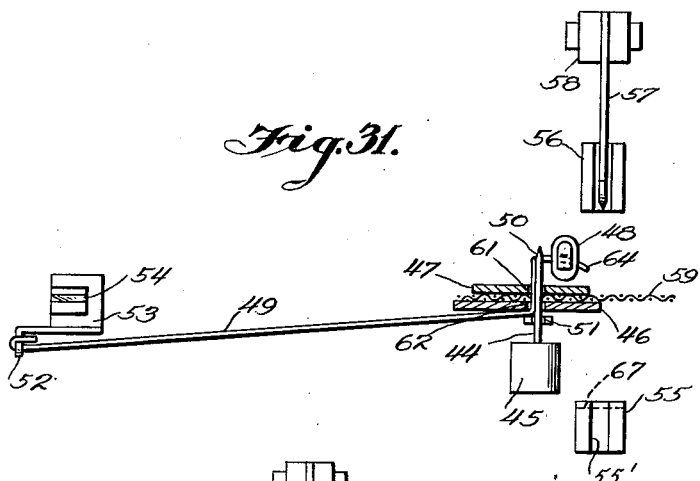
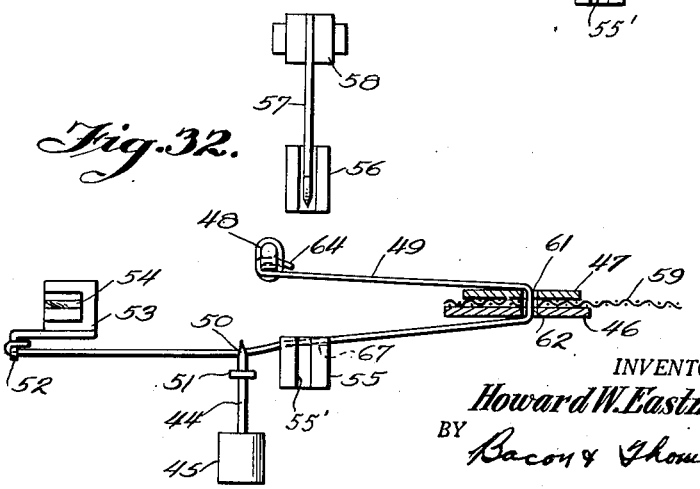
INVENTOR.
Howard W. Eastman
BY Bacon & Thomas
ATTORNEYS April 11, 1950  H. W. EASTMAN  2,503,809
TAG APPLYING METHOD AND MACHINE
Filed Sept. 5, 1945  23 Sheets-Sheet 22
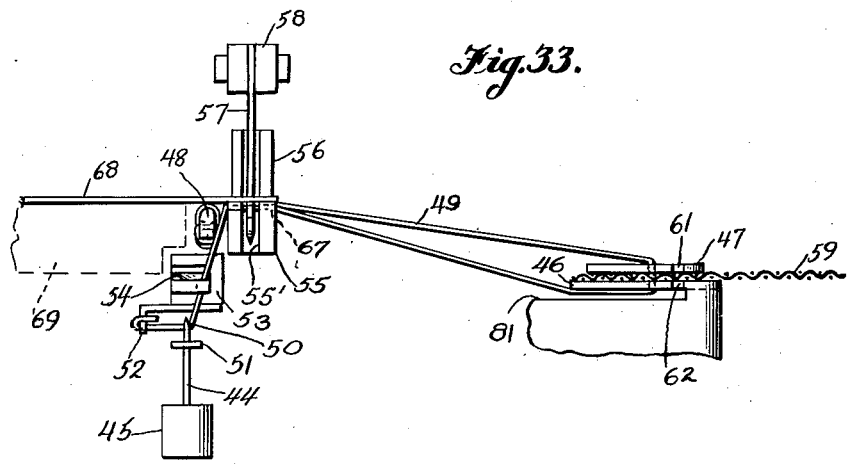
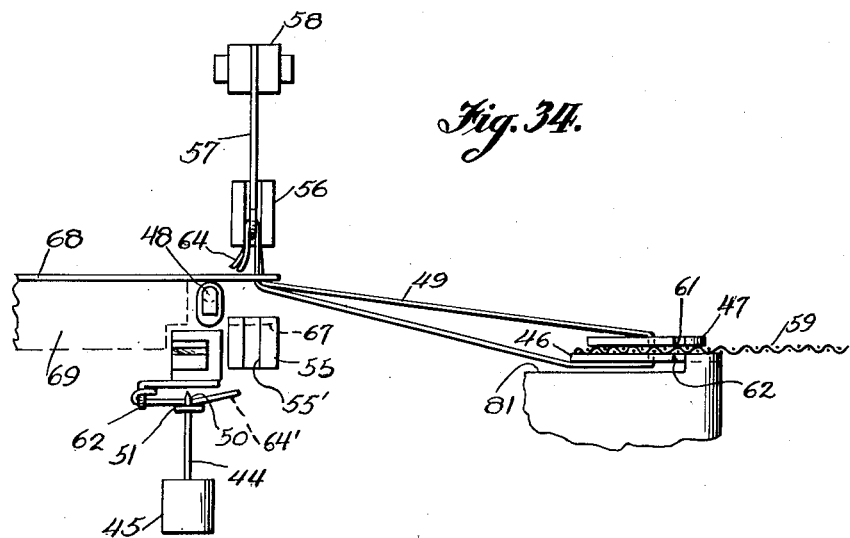
INVENTOR.
Howard W. Eastman
BY Bacon & Thomas
ATTORNEYS

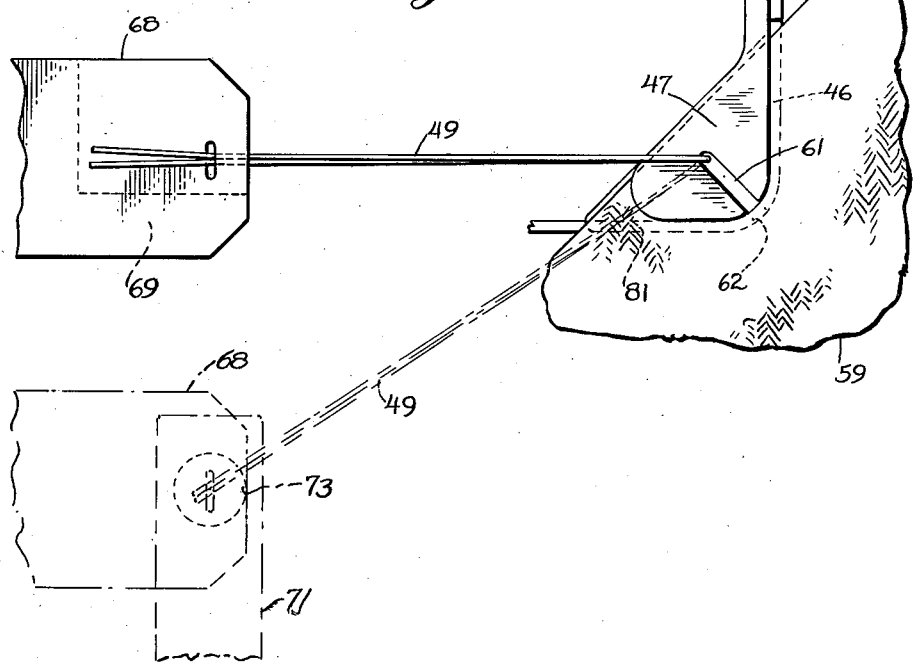
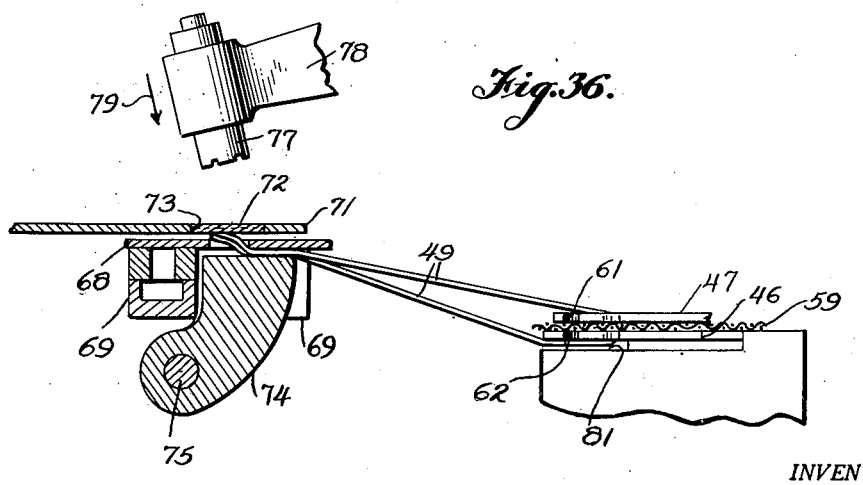

Patented Apr. 11, 1950

2,503,809

UNITED STATES PATENT OFFICE 2,503,809

TAG APPLYING METHOD AND MACHINE

Howard W. Eastman, San Francisco, Calif.

Application September 5, 1945, Serial No. 614,544

29 Claims. (Cl. 112—104)

1

This invention relates to a tag applying method and machine and more particularly to a machine which threads a cord through a fabric or similar material to form a loop and then seals a tag to the ends of such loop so as to prevent unauthorized reattachment of the tag after it has been detached.

It is usually desirable to attach at least one tag to clothing or other articles of merchandise carrying such information as price and cost data, trade-marks, quality and size indicia, etc. It is further desirable to attach tags in such a manner that they can not be removed and reattached without detection. Various types of tags including pin tickets and cord attached tags have been employed and various types of seals have been suggested including bendable or compressible metallic seals. Such tags have been difficultly applied and have not entirely prevented removal and unauthorized replacement of the tag.

In accordance with the present invention, a tag is attached to a fabric or other material by threading a cord through the material of the article, forming a loop in the cord and then sealing the ends of the loop to the tag with sealing wax or similar material stamped with any desired indicia so that removal of the tag requires breaking of the seal or cord or tearing of the tag. The invention also includes the provision of a machine which requires merely the insertion of the article to be tagged into a work receiving position and starting of the machine. The machine then automatically threads a cord through the article to be tagged, draws a loop, severs the cord to provide free ends which are pulled through a tag and thereafter sealed to a tag with wax, after which the article and tag are released from the machine so that the article with tag attached can be withdrawn. The entire operation is automatic and quickly accomplished so that tags may be attached and sealed to articles substantially as rapidly as such articles can be presented to the machine.

It is therefore an object of the invention to provide an improved method of attaching tags to articles of clothing or other articles in which a seal is formed to prevent removal and reattachment of the tag without detection.

Another object of the invention is to provide a method of attaching tags to fabrics or similar material in which the tag is attached with a cord loop passing through the material and the free ends of the loop are sealed to the tag.

Another object of the invention is to provide an improved machine for attaching and sealing tags to a fabric or other material so as to prevent their removal and reattachment without detection.

Another object of the invention is to provide a machine which threads a loop of cord through a fabric or similar material and thereafter seals the ends of the loop to a tag.

A further object of the invention is to provide an automatic machine which attaches a tag to an article of clothing or similar article by threading a cord through a selected portion of such article and thereafter forming a loop from the cord and sealing the free ends of such loop to a tag after passing the same through a tag.

A further object of the invention is to provide a tag attaching machine which automatically attaches a tag to fabric or similar material by forming a loop of cord through a selected portion of such material and thereafter forming a wax seal on the tag covering the free ends of the cord loop.

Other objects and advantages of the invention will appear in the following description of a preferred embodiment of apparatus for carrying out the present invention shown in the attached drawings, of which Figure 1 is a plan view of a machine in accordance with the present invention;

Figure 2 is a detail partly in vertical section showing a portion of the work holding mechanism;

Figure 8 is a side elevation of the carriage mechanism looking toward the left in Figure 7;

Figure 9 is a front elevation of the carriage mechanism;

Figure 10 is a rear elevation of the carriage mechanism;

Figure 11 is a partial side elevation of the carriage mechanism looking toward the right in Figure 7;

Figure 12 is a plan view partly in section of a portion of the carriage moving mechanism as well as other linkage;

Figure 13 is a plan view of the knife mechanism;

Figure 14 is a front elevation of the knife mechanism;

Figure 15 is a side elevation of the knife mechanism looking toward the right in Figure 14;

Figure 16 is a plan view of the tag feeding mechanism;

Figure 17 is an elevation of the lever operating the air valve of the tag feeding mechanism;

Figure 18 is a rear elevation of the tag feeding mechanism;

Figure 19 is a vertical section through the tag feeding mechanism taken on the line 19—19 of Figure 18;

Figure 20 is a vertical section through the air valve of the tag feeding mechanism taken on the line 20—20 of Figure 19;

Figure 21 is a horizontal section through the tag feeding mechanism taken on the line 21—21 of Figure 18;

Figure 22 is a detail showing the tag slide in plan;

Figure 23 is a detail showing the lower member of the tag slide in plan;

Figure 24 is a plan view of the wax applying mechanism;

Figure 25 is a detail showing parts of the operating links and cam cranks for the wax applying mechanism;

Figure 26 is a side elevation of the wax applying mechanism;

Figure 27 is a rear elevation of the wax applying mechanism;

Figure 28 is a vertical section through the wax applying mechanism taken on the line 28—28 of Figure 27;

Figure 29 is a cam motion time chart;

Figure 30 is a diagrammatic view showing the position of certain parts at the beginning of the tag applying operation;

Figure 31 is a view similar to Figure 30 showing the position of certain of the parts of Figure 30 during the threading of the cord through the material;

Figure 32 is a view similar to Figure 30 showing the position of the parts of Figure 30 during forming of the cord loop;

Figure 33 is a view similar to Figure 30 showing the loop after formation and just prior to pulling the cord ends through the tag;

Figure 34 is a view similar to Figure 30 showing the position of the parts when the cord ends have been pulled through the tag;

Figure 35 is a diagrammatic view showing certain of the parts during movement of the tag to waxing position; and Figure 36 is a diagrammatic view showing the tag in wax stamping position.

General structure

Figure 3:
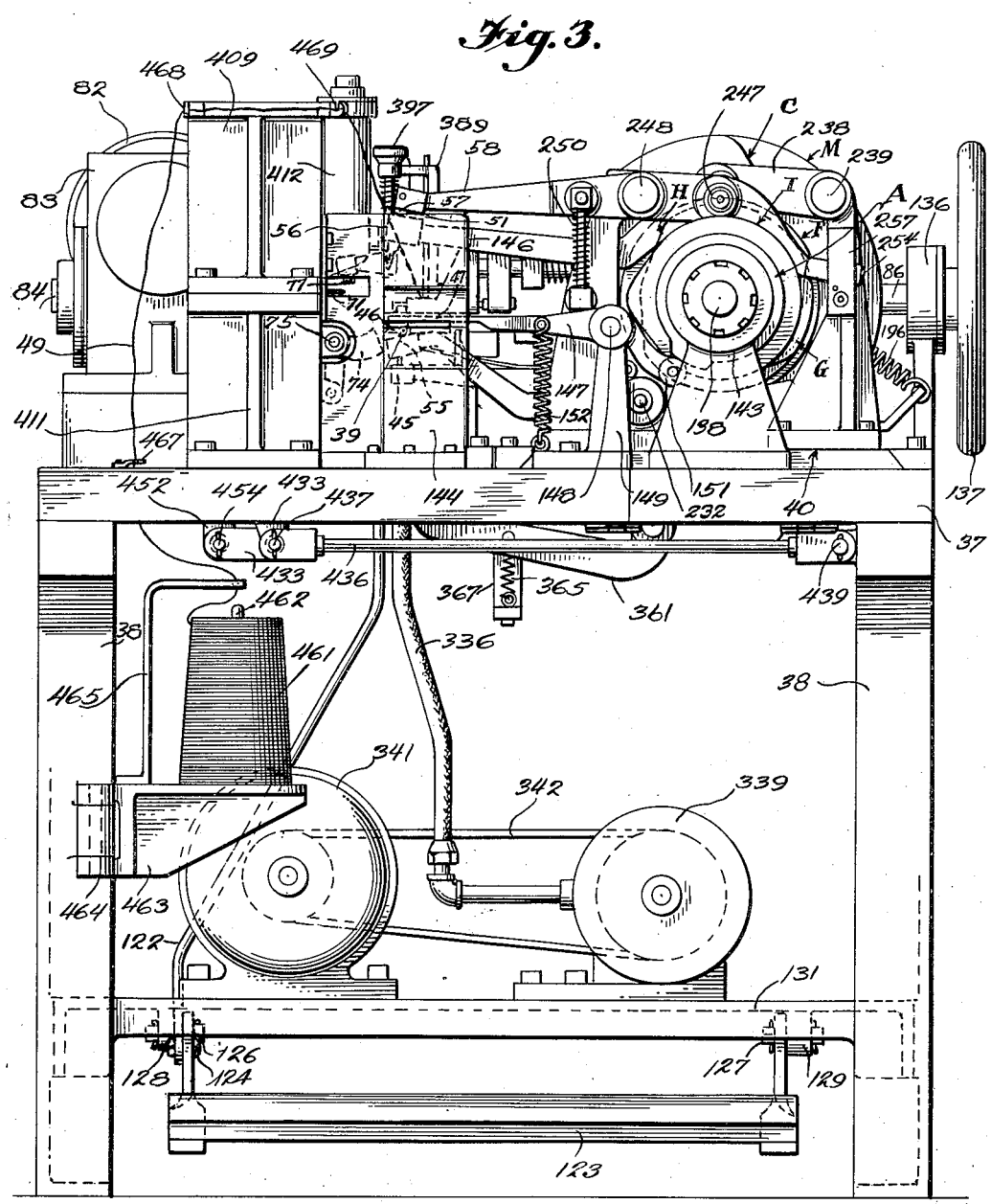
Figure 3 is a side elevation of the machine looking toward the left in Figure 1.

The machine of the present invention includes a frame in the form of a table having a top frame member or table top 37 (Figures 1 to 3) and side frame members 38 forming legs for the table. The mechanism for attaching the tag is supported largely upon the top frame member 37 and includes a work support and work clamp mechanism indicated generally at 39 as well as a sliding carriage indicated generally at 40. This carriage supports the major portion of the mechanism which cooperates with the work support and work clamp mechanism 39 for threading a cord through the article to be tagged, forming a loop in the cord and pulling the ends of the loop through a tag. A cord cutting mechanism for cutting the cord after the loop has been formed is also supported on the upper frame member 37 and is indicated generally at 41 (Figure 1). This cord cutting mechanism does not move with the carriage 40.

A tag feeding device indicated generally at 42 presents a tag to the mechanism on the carriage 40 at the correct time for this mechanism to perforate the end of the tag and pull the free ends of the loop through the resulting perforation. The tag feeding device then moves the tag with the free ends of the loop extending therethrough to a position adjacent a wax applying device shown generally at 43. Sealing wax is applied to the tag and cord ends by the wax applying device and stamped to form a seal on the tag end to seal the cord ends to the tag.

Operations performed by the machine

As an aid in understanding the invention and before giving a detailed description of the machine, reference will be made to Figures 30 to 36, which show diagrammatically the operations performed by the machine of the present invention. These figures show certain elements of the machine in various positions which they occupy during the operation of the machine unobscured by the mechanism for operating these elements. Thus, Figure 30 shows the initial position of a needle 44 carried by a needle lever 45. These elements are shown positioned below a work receiving table 46 above which is positioned a work clamp 47 in turn surmounted by a cord end gripper 48. A cord 49 extends through an eye 50 in the needle 44 and is held against slippage therefrom by a spring member 51 carried on the needle lever 45. This cord extends from a cord guide 52 carried on a knife guide 53 containing a knife 54 for severing the cord in a later operation of the machine. The needle 44, needle bar 45 and spring member 51, as well as the cord end gripper 48, form part of the mechanism supported by the carriage 40 and are shown most clearly in Figure 11 described in more detail below. The initial positions of a tag support 55, a tag clamp 56 and cord hook 57 carried by a cord hook lever 58 are also shown in Figure 30. The structure of these elements is shown most clearly in Figure 8 also described more in detail below. These elements also form part of the mechanism supported by the carriage 40.

When the various elements are in the position shown in Figure 30, a piece of fabric or other material 59 (Figure 31) is inserted between the work table 46 and the work clamp 47. The work clamp 47 then moves downwardly to the position shown in Figure 31 to grip the work piece 59 between the work clamp 47 and the work table 46. The work clamp 47 and the work table 46 are provided with registering slots 61 and 62, respectively, extending diagonally into these members and providing needle receiving apertures therein. The needle then moves upwardly through the work table 46, fabric 59 and work clamp 47 to the position shown in Figure 31, the spring member 51 striking the work table 46 and being retained therebelow. The free end 64 of the cord 49 enters the cord gripper 48 which then closes to grip the free end of the cord. The needle then moves downwardly again to approximately the position shown in Figure 30.

The needle lever 45 including the needle 44 and spring member 51, as well as the cord gripper 48, the tag support 55, the tag clamp 56 and the hook lever 58 carrying the hook 57, then move through the position shown in Figure 32. That is to say, the carriage 40 carrying all of these elements moves to the left from its initial position. During this movement, the tag support 55 and tag clamp 56 begin to move toward each other, the hook lever 58 and the hook 57 following the tag clamp 56. This movement of the elements to the left draws a loop in the cord 49, the end 64 of the cord being gripped in the cord gripper 48 and running freely through the slots 61 and 62 in the work clamp 47 and work table 46, respectively. The cord also runs freely through the eye 50 of the needle 44 as the spring member 51 is held below the eye 50 by means hereafter described. The cord also runs freely through cord guide 52 attached to the knife guide 53. The tag support 55 is provided with a transverse slot 67 which picks up the lower portion of the cord 49 between the needle 44 and the work table 46.

Continued motion of the carriage 40 to the left, as well as vertical motion of the elements 55, 56, 57 and 58, brings the various elements into the position shown in Figure 33, both sides of the loop in the cord 49 now having been picked up by the tag support 55 and being positioned in the groove 67 in the tag support 55. The needle 44 is positioned below the knife guide 53 so that the portion of the cord between the needle 44 and the tag support 55 is positioned in the path of the knife 54. Prior to the time the elements carried by the carriage reach the position shown in Figure 33, a tag 68 carried on a tag slide 69 has been fed into the position shown in Figure 33 so that the end of the tag 68 is clamped between the tag suport 55 and the tag clamp 56. After the tag is clamped, the hook lever 58 continues to move downwardly until the hook 57 has perforated the tag 68 and occupies a position below the two halves of the cord loop, the lower end of the hook extending downwardly into a slot 55' in the tag support 55. The hook and other elements carried by the carriage now occupy the position shown in most of the figures of the drawing including Figures 7 to 11, inclusive.

The hook 57 then moves upwardly into the position shown in Figure 34. At about the time that the hook starts to move upwardly, the knife 54 is actuated to sever the cord 49 to provide a new free end 64' on the cord. Also, at about this time, the cord gripper 48 opens to release the original free end 64 of the cord so that the upwardly traveling hook picks up the two ends of the cord loop and pulls them through the tag 68 into the position shown in Figure 34, the tag clamp 56 following the hook upwardly and the tag support 55 moving downwardly. The carriage 40 is now in condition for return to its original position and moves to the right in Figure 1 so as to again return the various elements carried by the carriage to the position shown in Figure 30. The spring member 51 is released during operation of the knife 54 so that it again grips the cord in the eye 50 of the needle to pull the cord through the cord guide 52 as the carriage returns to its initial position.

The tag feeding slide 69 carrying the tag 68 is then moved laterally with the tag from the position shown in Figure 34. This movement is indicated in Figure 35 by the dotted line position of the tag 68, Figure 35 being a diagrammatic sketch showing certain of the operating elements in plan. The free ends of the cord loop formed of the cord 49 are pulled partly back through the tag 68 by reason of the fact that the cord loop is still held in the slots 61 and 62 of the work clamp 47 and work table 46, respectively. This positions the tag 68 in a wax receiving position shown at the lower portion of Figure 35 and in Figure 36 with the ends of the cord loop projecting through the tag. A wax slide 71 shown in dash-dot lines in Figure 35 and in cross section in Figure 36 is then projected over the tag 68 which is still retained on the tag slide 69. The wax slide 71 carries a membrane of melted wax 72 in an aperture 73 thereof. A wax anvil 74 pivoted at 75 is moved upwardly under the tag 68 after the slide 69 has been moved to the wax applying position and a wax stamp 77 carried by a wax stamp arm 78 then moves downwardly as indicated by the arrow 79 in Figure 36 to transfer the wax 72 to the tag 68 and form a seal on the tag covering the ends of the cord loop. The wax applying mechanism including the wax slide, wax stamp and wax stamp anvil are shown in Figures 24 to 28 and will be described in greater detail below.

As soon as the wax stamp 77 again moves upwardly, the wax slide 71 is retracted, the wax anvil 74 lowered and the tag 68 released from the tag slide 69 as hereafter described in more detail. At about the same time, the work clamp 47 moves upwardly from the position shown in Figure 36 to the position shown in Figure 30 thus releasing the work 59. The work 59 may then be withdrawn from between the work clamp 47 and work table 46, the cord loop being withdrawn through the slots 61 and 62, the slot 62 being extended below the work table 46 as shown at 81 in Figures 35 and 36 so as to completely release the cord loop from the work clamp 47 and work table 46. Withdrawal of the work piece 59 withdraws the tag 68 now attached and sealed to the cord loop. The tag slide 69 then returns to its original position and is retracted to position it for feeding another tag. The carriage has already returned to its original position so that the machine is conditioned for another tag applying operation. All of the above operations are performed during a single revolution of the main and cam shafts of the machine, the drive for which will be next described.

*Driving mechanism*

The driving mechanism for the machine includes a motor 82 shown in Figures 1, 3, 4 and 5. This motor may be provided with any known or suitable speed reducer 83, the details of which are not shown, the speed reducer having a driven shaft 84. A one revolution clutch shown most clearly in Figure 5 connects the driven shaft 84 of the speed reducer 83 with the main shaft 86. The one revolution clutch includes a rotating element 87 keyed to the driven shaft 84 and secured to a rotating element 88 journaled on the main shaft 86, the element 87 being secured to the element 88 by means of a pin 89. The main shaft 86 is provided with a collar 91 rigidly secured to its end and received in a circular recess 92 in the rotating element 87 attached to the driven shaft 84. A second collar 93 is similarly secured to the main shaft 86 so that the rotating element 88 is positioned between the collars 91 and 93. The main shaft 86 is provided with a keyway 94 receiving a sliding key 96 and in the position of this key shown in Figure 5, the member 88 is free to rotate on the shaft 86. The rotating member 88 is also supplied with a keyway 97 which registers with the keyway 94 of the shaft 86 in one position of the rotating member 88.

The main shaft 86 is journaled in a bearing 98 supported on a bearing standard 99 suitably secured to the upper frame member 37 of the machine. The bearing standard 99 also provides a support for a clutch actuator 102 having its lower end pivoted at 103 to a crank 104 in turn pivoted at 105 to the bearing standard 99. The clutch actuator 102 extends into a recess 106 in the collar 93, this recess extending part way around the collar 93. The clutch actuator 102 holds the key 96 in the position shown in Figure 5 when the main shaft 86 and collar 93 are stationary. The clutch actuator may be retracted from its position shown in Figure 5 which allows the key 96 to move downwardly and to the right in Figure 5 to enter the keyway 97 in the member 88 when the keyway 97 becomes opposite the keyway 94. This locks the member 88 to the shaft 86 so that the shaft 86 is driven from the shaft 84. The clutch actuator 102 may be withdrawn to actuate the clutch by means of a pull rod 107 pivoted to the crank 104 at 108, the spring 109 urging the clutch actuator 102 to its position shown in Figure 5. The clutch actuator 102 is provided with a cam face 110 which upon return of the clutch actuator cams the key back to its position shown in Figure 5 along the inclined cam faces 111 and 112 in the collars 91 and 93, respectively, to release the shaft 86 from the member 88 after one revolution.

The rod 107 which operates the clutch actuator 102 may extend through the upper frame member 37 and be provided with an annular shoulder member 113 positioned in the path of a latch 114. The latch 114 is carried by a member 116 pivoted to a bracket 117 at 118, the bracket 117 being secured to the upper frame member 37. The latch 114 is pivoted to the member 116 at 119 for movement clockwise around the pivot 119, the latch 114 being returned to its position shown in Figure 5 by a tension spring 121. A pull rod 122 connects the pivoted member 116 with a starting pedal 123 (Figures 3 and 4), the lower end of the rod 122 being pivotally connected to one arm of the pedal 123 at 124. The pedal 123 is pivoted at 126 and 127 to bearing members 128 and 129 on a platform 131 secured to side frame members 38 of the machine. The pull rod 122 as well as the pedal 123 and the pivoted member 116 (Figure 5) are returned to their upward position after depression by the operator by means of a spring 134 connected between an arm of the pivoted member 116 and the upper frame member 37.

Upon depression of the pedal 123, the latch 114 engages the shoulder member 113 to retract the actuator 102 to cause one revolution of the shaft 106. As soon as the actuator 102 has been retracted, the latch 114 releases the shoulder member 113 by reason of the pivoted member 116 swinging about its pivot 118. The actuator 102 is then returned to its original position by the spring 109 to stop rotation of the shaft 86 after one revolution. Upon release of the trip pedal 123, the spring 134 returns the pivoted member 116 to its original position shown in Figure 5, the latch 114 rotating about its pivot 119 to pass the shoulder member 113. By this structure, a separate actuation of the pedal 123 is required for each operation of the machine and the machine will not attach a plurality of tags in the same position on the work piece presented to the machine unless the operator releases and again depresses the pedal 123.

As shown in Figure 1, the main shaft 86 in addition to being journaled in the bearing 98 is likewise journaled at its opposite end in a bearing 136 secured to the upper frame member 37 and has a hand wheel 137 at its free end for manually moving the elements of the machine. The main shaft 86 drives a cam shaft 138 through beveled gears 139 and 141, the cam shaft 138 being journaled in bearings 142 and 143 also secured to the upper frame member 37. It is apparent that one revolution of the main shaft 86 will also cause one revolution of the cam shaft 138. A plurality of cams are mounted upon both the cam shaft 138 and the main shaft 86 for operating the machine. These cams are listed in Figure 29 as A to M, inclusive, and will be referred to by letter in the following detailed description. Figure 29 is also a time chart showing the angle through which the main shaft and cam shaft have turned when a given operation is performed. All of the cams in the various drawings are shown in their 160° position except in Figure 3 in which the mechanism including the work clamp cam A is shown in the 0° position.

*Work table and work clamp structure*

As shown in Figures 1 and 2, the work table 46 is carried by a standard 144 secured to the upper surface of the upper frame member 37. This work table is approximately triangular in shape and is provided with the diagonal slot 62 described above, a continuation of this slot extending along a vertical side of the standard 144 immediately beneath the table as indicated at 81. The standard 144 also forms a protecting member for the hands of the operator and a cover for the needle lever 45 and needle 44 as well as for the tag support 55 to prevent any injury to the operator by these members or soiling of the work piece. As shown in Figures 2 and 3, an upper shield 146 secured to the wax applying mechanism may be employed to protect the work clamp 46 in its uppermost position as well as the cord gripper 48 and the hook arm 58, hook 57 and tag clamp 56 when the mechanism is in the work receiving position.

The work clamp 47 forms a continuation of a lever 147 (Figures 1 and 3) which is pivoted at 148 to a standard 149 secured to the upper frame member 37. The lever 147 carries a cam follower roller 151 at its other end which cam follower roller engages a work clamp cam A secured upon the cam shaft 138. The cam A is shown in its zero position, that is, with the work clamp 47 open. Shortly after the shaft 138 starts to rotate due to actuation of the pedal 123, the work clamp closes. Thus, a work piece can be inserted into the space between the work table 46 and work clamp 47 and pedal 123 actuated to clamp the work in position, the work clamp being carried to clamping position by a spring 152 shown most clearly in Figure 3. The work clamp remains in clamping position until the cam shaft 138 has substantially completed its rotation at which time the work is released for withdrawal from the machine with a tag attached thereto. Thus, the work clamp remains closed during the tag attaching operation including the threading of the cord through the article held in the work clamp, the reciprocation of the carriage 49 to form a loop in the tag attaching cord, and the sealing of the ends of the loop to the tag.

Loop forming carriage

The carriage 40 which carries the needle lever 45 and needle 44 as well as the cord gripper 48 between work threading position and tag threading position, is mounted for reciprocation in ways formed between the upper frame member 37 and guide members 155 and 156 (Figure 8). The guide members 155 and 156 have inclined portions receiving beveled edges 157 of a base 158 forming part of the carriage 40. Guide members 155 and 156 are suitably secured to the table top 37 and the front guide member 155 may be adjusted toward and away from the carriage platform 158 by means of adjusting screws 159. The carriage base 158 has depending bearing members 161 receiving a cross shaft 161 forming a pivot for one end of carriage reciprocating links 163 and 164 held in position longitudinally of the shaft 162 between the bearings 161 and collars 166 secured to the shaft 162. As shown in Figure 12, the links 163 and 164 have their opposite ends pivotally connected to levers 167 and 168, respectively, which levers extend upwardly through the upper frame member 37 and are secured to a cross shaft 169 (Figure 6) journaled in bearings 171 and 172 (Figure 1), the bearings being secured to the upper frame member 37. The lever 168 has a cam follower roller 173 journaled on its upper end (Figure 6) which roller 173 engages the periphery of the carriage reciprocating cam D secured on the main drive shaft 86.

Figure 6:
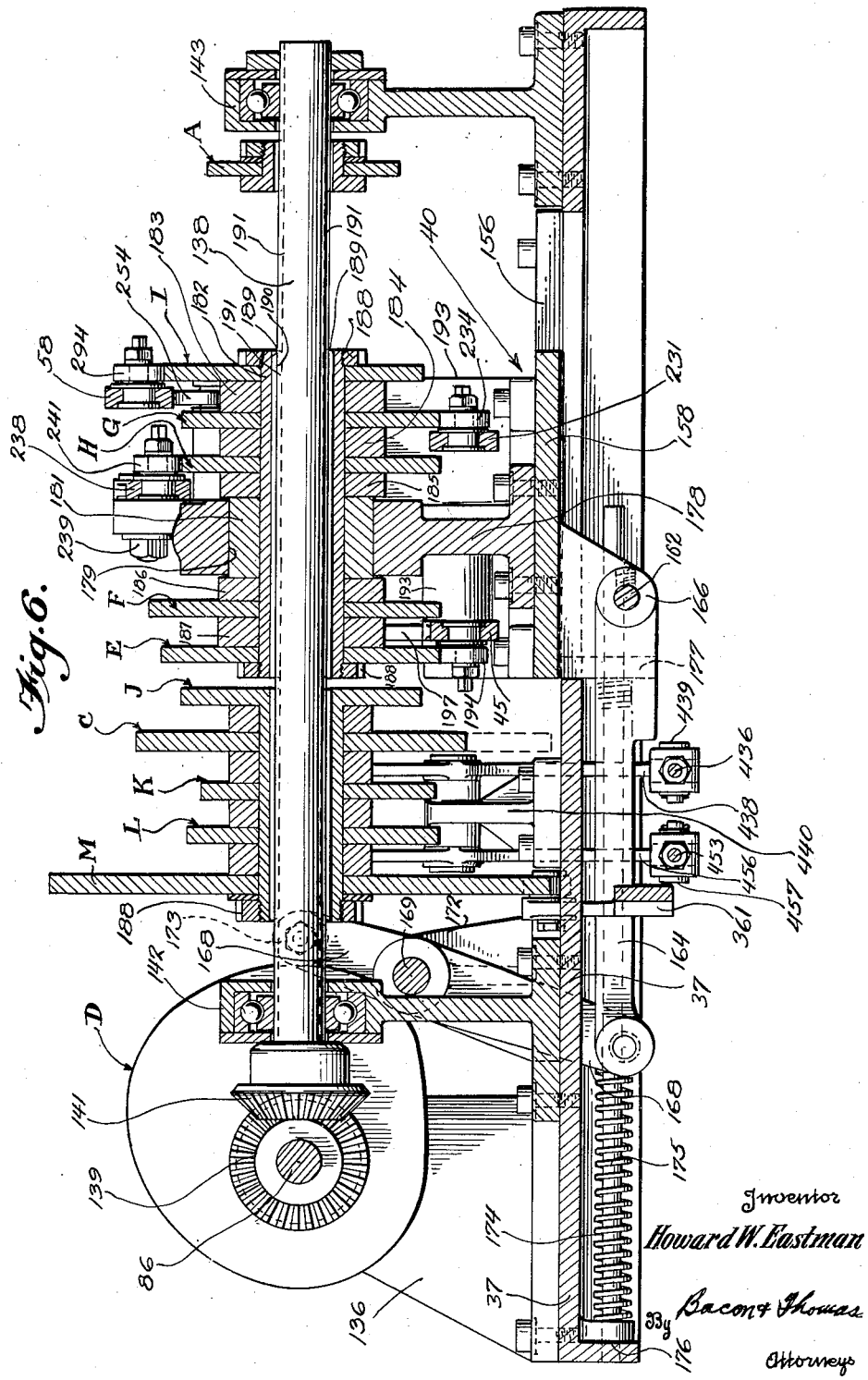
Figure 6 is a vertical section along the cam shaft of the machine taken on the line 6—6 of Figure 1.
Figure 7:
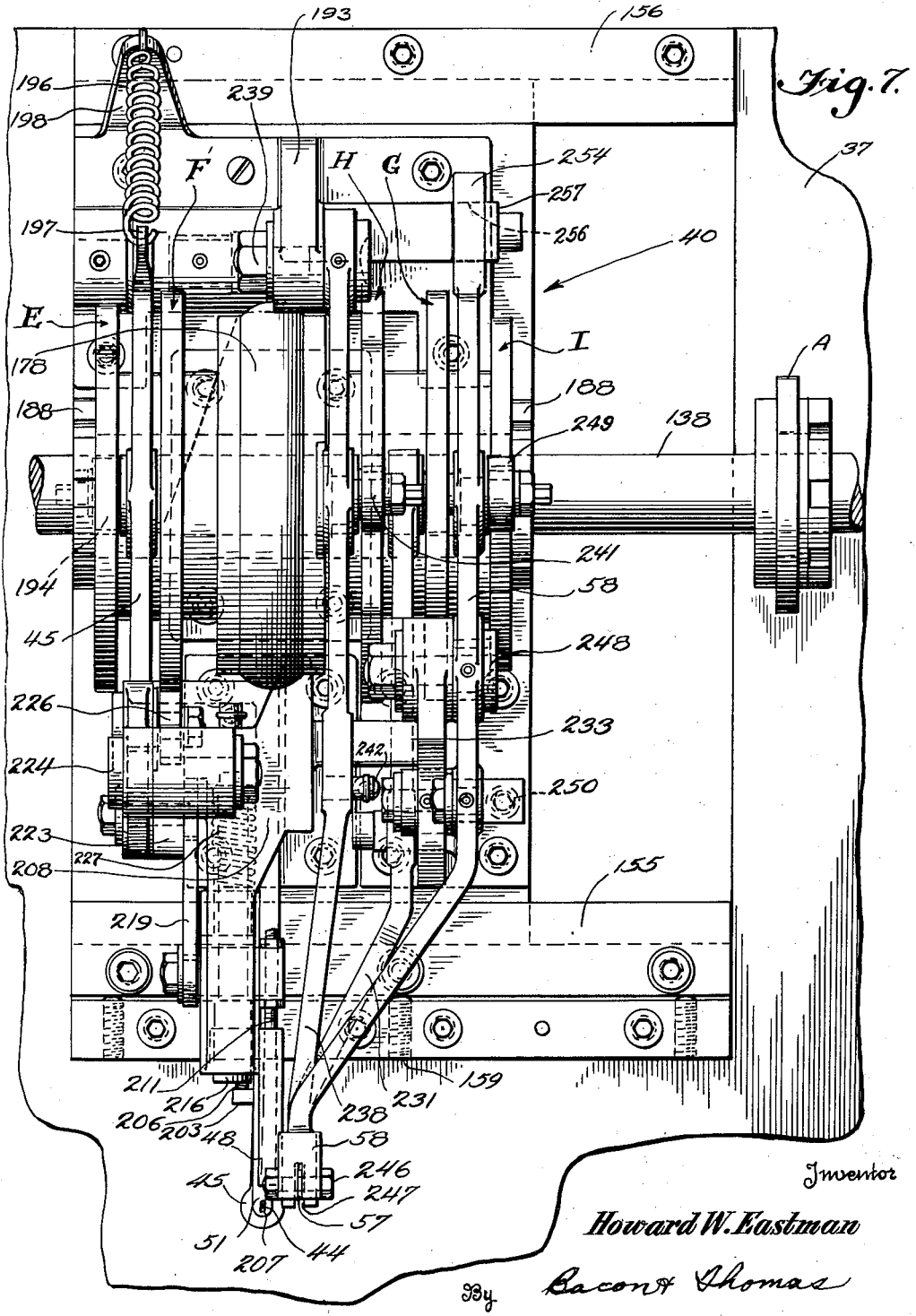
Figure 7 is a plan view of the carriage mechanism.

The carriage is shown in its leftmost position in Figure 6, the arm follower roller 173 engaging the outer dwell portion of the cam D. The carriage is returned to the right in Figure 6 by means of compression springs 174 surrounding rods 175 having one end secured in the edge of the upper frame member 37 at 176 and their other ends extending through apertures in a depending portion 177 forming part of the carriage base 158. It is apparent that rotation of the cam D will pull the carriage to the left in Figure 6 through the arms 167 and 168 and links 163 and 164 and that the carriage will be returned to the right in Figure 6 by the springs 174 upon continued rotation of the cam D. At the zero position of the shaft 86, the cam follower roller 173 engages the inner dwell portion of the cam D so that the carriage is at the right in Figures 1 and 6 and the needle 44 and cord gripper 48 are at the work threading or work receiving position.

The carriage base 158 has an upstanding bearing standard 178 (Figure 6) suitably secured to the base 158. The bearing standard 178 has a bearing 179 concentric with the cam shaft 138 in which a rotatable collar 181 is journaled, the collar receiving internally a cam supporting sleeve 182. The cam supporting sleeve 182 has mounted thereon a plurality of cams E, F, G, H and I separated by spacing collars 183, 184, 185, 186 and 187. The sleeve 182 is provided with end nuts 188 screw threaded thereon so that the cams E to I, inclusive, and the spacing collars 183 to 187, inclusive, as well as the collar 181, are gripped between the nuts 188 so as to be held in adjusted position non-rotatably on the sleeve 182. The sleeve 182 is provided with keyway 189 receiving keys 190 also engaging in keyways 191 in the cam shaft 138 so that the sleeve 182 carrying the cams E to H, inclusive, can be reciprocated along the shaft 138 with the carriage while held against rotation with respect to the shaft 138. This enables the carriage to be reciprocated laterally in Figure 6 carrying the cams E to I, inclusive, as well as the needle lever 45 and needle 44 and other mechanism.

Needle operating mechanism

As shown most clearly in Figure 11, the needle lever 45 is pivoted at 192 in a bracket 193 secured to the base 158 of the carriage and carries intermediate its ends a cam follower roller 194 which engages cam E, the left hand cam on the carriage in Figures 1 and 6. The needle lever 45 is resiliently urged in a counterclockwise direction about its pivot 192 in Figure 11 by a tension spring 196 extending between an arm 197 integral with the needle lever 45 and a member 198 secured to the bracket 193. As also shown most clearly in Figure 11, the spring member 51 which prevents slippage of the cord through the eye 50 of the needle 44 during a part of the operation of the machine is secured to the needle lever at 199 and has a laterally extending lug 201 intermediate its ends for engagement by a latch 202 on a latch member 203 pivoted at 204 on the needle lever 45. The latch member 203 is urged in a counterclockwise direction in Figure 11 by a tension spring 206 extending between the latch member 203 and the needle lever 45. The spring member 51 has a narrow longitudinally extending slot 207 receiving the needle 44 and when in its uppermost position the spring member 51 securely holds the end of the cord against slippage through the eye 50 of the needle. When the spring member 51 engages beneath the work table 46 (Figure 31) and the needle again moves downwardly, the latch 202 engages over the projection 201 (Figure 11) to hold the spring member in the position shown in Figure 11 so that the cord is free to run through the eye 50 of the needle. At a later time, the latch member 203 is moved out of engagement with the lug 201 to allow the spring member 51 to again hold the cord. This latter movement of the latch 203 is caused by movement of the cord severing knife 54 as will be later described. At about the same time that the knife severs the cord, the cord end gripper 48 releases the free end of the cord to enable the ends of the severed cord loop to be pulled through the tag.

Cord end gripper

The details of the cord end gripper 48 are also most clearly shown in Figure 11. This cord end gripper is positioned above and to the right of the needle 44 when the needle is in its lowermost position (see Figure 9). Again referring to Figure 11, the cord gripper includes a bracket 208 also secured to the base 158 of the carriage. This bracket terminates in its upper end in a forked portion carrying a guide portion 209 through which the cord gripper element 211 is reciprocable. The cord gripper element 211 has a head portion 212 which cooperates with the guide portion 209 to form a cord gripping slot 213. When the cord gripper element 211 is moved toward the left in Figure 11, the cord is gripped between the head 212 and the guide portion 209 and when the member 211 is moved to the right in Figure 11, the end of the cord is released.

The gripper member 211 is secured to a cross head 214 in turn secured to a sliding rod 216 reciprocable in apertures 217 and 218 of the forked portion of the bracket 208. A link 219 has one end pivoted to the member 214 at 221 and its other end pivoted at 222 to a bell crank 223, which is pivoted on the bracket 208 at 224. The bell crank 223 carries a cam follower roller 226 engaging the cam F on the cam shaft 138. A compression spring 227 is positioned between a collar 228 on the sliding rod 216 and one of the forked members of the bracket 208 to urge the cam follower roller 226 against the cam F and also move the cord gripper member 211 to cord gripping position under control of the cam F.

The needle lever 45 and cord gripper 48 are thus mounted on and move with the carriage and the same is true of their operating cams E and F so that the cams E and F can actuate the needle and cord gripper independently of the position of the carriage. As explained above with respect to Figures 30 to 34, the needle moves upwardly through slots in the work table 46 and work clamp 47 to carry the end of the cord through the work piece positioned between the work table and the work clamp. This positions the free end of the cord in the slot 213 (Figure 11). The cord gripper member 211 then moves to the left in Figure 11 to grip the end of the cord after which the needle moves downwardly so as to clear the work table 46. Immediately thereafter the carriage begins to move to carry the needle 44 and cord gripper 48 to the left in Figure 32 to draw a loop in the cord. During this movement of the needle and cord gripper to the left in Figure 32, the tag support 55 moves upwardly (Figure 32) and the tag clamp 56 as well as the hook bar 58 and hook 57 begin to move downwardly.

*Tag perforating and hook mechanism*

The details of this mechanism including the tag support 55, tag clamp 56, hook lever 58 and hook 57 are shown most clearly in Figure 8. The tag support 55 forms a part of a lever 231 pivoted at 232 on a bracket 233 secured to the base 158 of the carriage. The other end of the lever 231 carries a cam follower roller 234 which engages cam G on the cam sleeve 182. The tag support 55 reaches the position shown in Figure 8 shortly after the carriage returns to the left in Figure 1. As described with reference to Figures 32 and 33, the tag support 55 has a laterally extending slot 67 for receiving the two sides of the cord loop and also has a slot 551 for receiving the lower end of the hook 57. The tag support lever 231 is urged in a counterclockwise direction in Figure 8 by means of a tension spring 235 extending between an arm 236 on the tag clamp lever and a pin 237 secured in the bracket 233. The cam G thus moves the tag support 55 to the position shown in Figure 8 against the tension of the spring 235, the tag support 55 being moved to its lowermost position by the spring 235.

The tag clamp 56 forms one end of a lever 238 pivoted at 239 on the bracket 193. The lever 238 carries a cam follower roller 241 intermediate its ends, the cam follower roller engaging the cam H on the cam sleeve 182. The tag clamp lever 238 is urged in a counterclockwise direction in Figure 8 about its pivot 239 by means of a tension spring 242 having one end secured to the pin 237 in the bracket 233 and the other end secured to the lever 238. The lever 238 carrying the tag clamp 236 is thus urged to its position shown in Figure 8 by the spring 242 and is moved to its uppermost position by the cam H acting through the cam follower roller 241. The tag clamp 56 has a slot 244 therethrough which acts as a guide for the lower portion of the hook 57.

The hook 57 is pivoted at 246 in a slot 247 in the hook lever 58. The hook lever 58 is pivoted at 248 on the bracket 233 and carries a cam follower roller 249, which engages the cam I on the cam sleeve 182. The hook lever 58 is urged in a clockwise direction about its pivot 248 by a compression spring 250 positioned between a pin 252 on the hook bar 58 and a pin 253 secured to the bracket 233. The cam I thus moves the hook 57 to its lower position shown in Figure 8 and the hook is moved to its uppermost position by the spring 250. After the tag, previously fed into position as hereafter described, has been clamped between the tag support 55 and the tag clamp 56, the movement of the hook downwardly through the tag clamp and tag support, perforates the tag. For this purpose, the hook has a cutting edge 251 (Figure 9) on its lower portion. Continued downward movement of the hook positions the hook below the two sides of the cord loop in the groove 67. Upward movement of the hook then picks up these loop sides and draws them through the perforation in the tag, the cord gripper 48 releasing the end of the cord and the knife 53 operating at about this time to sever the loop to enable the hook to draw the ends of the loop through the tag.

The hook lever 58 as well as the tag clamp lever 238, tag clamp lever 231 and needle bar 45 are all provided with lateral guides to maintain these members in definite positions laterally of the carriage even if the pivots for these members develop play. Thus, as shown in Figures 8 and 10, the hook lever 58 has a rearward extension 254 which moves vertically in a slot 256 formed in the bracket 193 and having one side closed by a guide plate 257 secured to the bracket 193. Similarly, the needle lever 45 has a portion intermediate its end sliding in a slot 258 (Figure 9) formed in the bracket 208 and having one side closed by a guide plate 259 secured to the bracket 208. Likewise, the tag clamp lever 231 has a portion intermediate its ends sliding in a slot 261 in the bracket 233, the slot 261 having one side closed by a guide plate 262. Also, the tag clamp lever 238 slides in a slot 263 between the brackets 208 and 233.

*Knife mechanism*

The details of the knife mechanism are most clearly shown in Figures 13, 14 and 15. This knife mechanism includes the reciprocating knife 54 slidably mounted in a knife guide 53, the knife guide, as shown in Figure 14, having a slot 264 in which the knife is reciprocated. The slot 264 in the knife guide 53 also receives a knife engaging member 265 extending from the knife guide 53 and having a notch 266 in which the cord is received for the cutting operation. A bowed spring member 267 is also received in the slot 264 above the knife 54 to resiliently compress the knife against the knife engaging member 265. The knife guide 53 has attaching portions 268 secured to a bracket 269 which is in turn secured to the upper frame member 37. Thus, the knife bracket and the knife are secured to the frame and do not take part in the motion of the carriage.

The bracket 269 is provided with a pair of upstanding guide members 271 and 272 in which a sliding rod 273 is reciprocable. The sliding rod 273 carries a collar 274 to which the rear end of the knife 54 is secured. A link 276 has one end pivoted to the collar 274 at 277 and the other end pivoted to one arm 278 of a bell crank including a shaft 279 journaled in the bracket 269 and to which the arm 278 is secured. The other arm 281 of the bell crank is likewise secured to the shaft 279 and carries at its free end a cam follower roller 282 which engages the cam J on the cam shaft 138. The knife is urged towards its position shown in Figures 13 and 15 by a compression spring 283 surrounding the sliding rod 273 and extending between a collar 284 on the rod 273 and the member 271 of the bracket 269. Thus, the cam J acting through the cam follower roller 282, bell crank levers 281 and 278, link 276 and collar 274 projects the knife 54 to cut a cord positioned in the notch 266, the knife being returned by the spring 283.

As shown in Figure 9, the knife guide 53 carrying the knife 54 occupies a position directly above the needle 44 and below the cord gripper 48 when the carriage is in its left or tag perforating position. The knife guide is thus correctly positioned to carry the cord guide 52 shown most clearly in Figure 15, the slot 287 in the cord guide 52 being in substantial alignment with the eye 50 of the needle 44. Also, the sliding rod 273 may have a trip member 288 secured to its end and positioned for engaging the upper end of the latch member 203 to disengage the latch 202 from the projection 201 on the spring member 51 which grips the cord in the eye 50 of the needle 44. This causes the cord to be secured in the eye 50 of the needle 44 at about the same time as the knife crosses the slot 266 (Figure 13) to sever the cord adjacent the needle.

Tag feeding mechanism

In the above description, it has been assumed that a tag 68 had been fed into a position to be clamped between the tag support 55 (Figure 8) and tag clamp 56 when the carriage 40 moves to the left in Figure 1. A tag 68 is fed into this position by the tag feeding mechanism now to be described so that the tag support 55 and tag clamp 56 clamp the tag 68 between these two members and the hook 57 moves downwardly through these members and the tag to perforate the same, and then upwardly to pick up the two ends of the cord loop and pull them upwardly through the perforation in the tag.

The tag feeding mechanism is indicated generally at 42 in Figure 1 and is shown most clearly in Figures 16 to 23, inclusive. In all of these figures, the tag feeding mechanism is shown in the position in which a tag has just been fed between the tag support 55 and the tag clamp 56. That is to say, the entire tag feeding mechanism is in its leftmost position in Figure 16 and the tag slide 69 is extended. As shown in this figure, the tag slide 69 has a notch 292 providing clearance for the cord gripper 48 and the tag support 55. The entire tag feeding mechanism with the tag slide 69 extended can be moved to the right in Figure 16 to carry the tag to a wax applying position.

As shown in Figures 18 and 19, the tag feeding mechanism includes a frame portion 293 substantially in the form of a box open at the top to receive the tag slide 69 and also open at the bottom. The end walls 294 and 296 terminate at their lower ends in beveled portions 297 and 298, respectively, sliding upon the upper surface of the top frame member 37. Guide members 299 and 301, respectively, secured to the top frame member 37 engage the beveled portions 297 and 298 to enable lateral sliding of the tag feeding mechanism. The front guide member 301 may be adjusted toward and away from the tag feeding mechanism by means of set screws 302 carried in a member 303 secured to the frame of the machine. As shown most clearly in Figure 18, the side walls of the frame member 293 of the tag feeding mechanism terminate at their top in guide members 304 and 305 for the tag slide 69. The guide members 304 and 305 have slots 306 and 307, respectively, receiving the slide member 69 for sliding movement longitudinally of the tag feeding mechanism.

The tag slide 69 has a lower member 308 secured thereto and as shown in Figures 19 and 20, the lower member 308 has a rack 309 suitably secured thereto and extending longitudinally of the slide. The rack meshes with a sector gear 311 (Figures 19 and 21) mounted on a shaft 312 journaled in a side member of the frame 293 of the tag feeding mechanism. The shaft 312 carries another sector gear 313 which in turn meshes with a sector gear 314 splined on a shaft 316 positioned at the rear of and extending laterally of the tag feeding mechanism. The shaft 316 is journaled in a bearing bracket 317 mounted on the top frame member 37 (Figure 19). The shaft 316 also extends through bearings 318 and 319 carried by the frame 293 of the tag feeding mechanism, the bearings 318 and 319 as well as the sector gear 314 being slidable axially along the shaft 316. The shaft 316 is restrained against endwise movement by a collar 321 on the end of the shaft and a crank 322 suitably secured to the shaft 316. The crank 322 carries a cam follower roller 323 at its free end, the cam follower roller engaging cam B on the main shaft 86 (Figure 19). The crank 322 is urged in a counterclockwise direction in Figure 19 by a tension spring 324 extending between a pin 326 on the crank 322 and an eye bolt 327 extending through the upper frame member 37. It is apparent that rotation of the cam B will rotate the crank 322 and the sector gear 314 in a clockwise direction in Figure 19 to rotate the sector gears 311 and 312 in a counterclockwise direction to retract the tag slide 69, further rotation of the cam B allowing the spring 324 to again project the slide to the position shown in Figure 19.

The cam slide 69 is provided on its lower surface with a groove or hollow 328 (Figure 20) which is closed by the lower member 308 of the tag slide. A plurality of apertures 329 extend upwardly through the tag slide 69 from the groove 328. The lower member 308 of the tag slide is provided with a downward extension 331 having an internal bore 332 communicating with the groove 328 at its upper end and intersecting a valve receiving bore 333. A three-way rotary valve 334 is positioned in the bore 333 and a vacuum conduit 336 is suitably secured to the extension 331 so as to communicate with the lower end of the bore 332. The downward extension 331 is also provided with an aperture 337 providing communication between the valve bore 333 and the atmosphere. In the position of the valve 324 shown in Figure 20, it is apparent that communication is established between the vacuum conduit 336 and the groove 328 in the tag slide and that rotation of the valve 90° counterclockwise in Figure 20 will place the groove 328 in communication with the atmosphere. The vacuum conduit 336 has its lower end connected to a vacuum pump 339 (Figure 3) mounted upon the platform 131, the vacuum pump being driven by an electric motor 341 through a belt 342, the motor 341 also being supported upon the platform 131.

As shown most clearly in Figure 21, the valve 334 is held against endwise displacement in the bore 333 by a shoulder 343 forming part of the valve and by a collar 344 held in position by a nut 346 screw threaded upon the end of the valve 334, the shoulder 343 and collar 344 engaging opposite sides of the downward extension 331. The valve 334 is provided with a valve operating stem 347 having keyways 348, the valve stem 347 extending through a sleeve 349 journaled in the end wall 294 of the frame 293 of the tag feeding mechanism. The sleeve 349 is provided with internal keyways 351 and keys 352 are received in the keyways 348 and 351 so that the stem 347 of the valve 334 can slide axially through the sleeve 349, the keys 352 causing rotation of the stem 347 with the sleeve 349. The sleeve 349 terminates at one end in a shoulder 353 having an extension providing a crank arm 354. The other end of the sleeve is provided with a collar 356 secured thereto, the collar 356 and the shoulder 353 preventing endwise motion of the sleeve 349 in the wall 294 of the tag feeding mechanism.

As shown most clearly in Figure 18, a link 357 has its upper end pivoted at 358 to the crank arm 354 on the sleeve 349 and its lower end pivoted at 359 to one end of a lever 361 journaled intermediate its ends on a stud shaft 362 mounted in a bracket 363 suitably secured to the lower surface of the upper frame member 37. The other end of the lever 361 carries a cam follower roller 364 engaging the cam M mounted on the cam shaft 138. The valve operating lever 361 is shown more clearly in Figure 17. The valve is shown in Figure 20 in a position which applies vacuum to the groove 328 in the slide 69 and the valve operating mechanism is shown in the same position in Figure 18. The cam M operating through the cam follower roller 364 forces the valve to vacuum applying position. A tension spring 365, the upper end only of which is shown in Figure 18 urges the valve operating mechanism to a position in which the groove 328 (Figure 20) is in communication with the atmosphere through the bore 332, valve 334 and aperture 337. The upper end of the spring 365 is attached to a pin 366 secured in the lever 361, the lower end of the spring 365 being attached to a suitable bracket 367, shown in Figure 3, the bracket being attached to the lower surface of the upper frame member 37 (Figure 19). When the valve 334 is in the position shown in Figure 20, a tag lying upon the upper surface of the slide 69 will be held in fixed position thereon by vacuum supplied through the apertures 329 in the slide. When the valve 334 is turned 90° by the mechanism just described, the vacuum in the groove 328 and apertures 329 is released so that the tag is released from the slide 69.

As shown in Figures 4, 16, 18 and 19, the portions 304 and 395 of the frame of the tag feeding mechanism carry side tag positioning members 368 and 369, respectively, for receiving a stack 371 of tags therebetween. The tag positioning members 368 and 369 are secured to slotted base members 372 and 373 which receive clamping screws 374 and 376, respectively, screw threaded into the frame of the tag feeding mechanism so that the side tag positioning members 368 and 369 may be adjusted toward and away from the stack 371 of tags to accommodate tags of different widths. A rear tag positioning member 377 is also provided, this member including a rearwardly extending slotted portion 378 receiving a clamping screw 379, the clamping screw 379 being screw threaded into a bridge member 381 secured to the tag guides 304 and 305 by screws 382. By this structure, the rear tag positioning member 377 may be adjusted to accommodate tags of different lengths. The tag stack guides 368, 369 and 377 form a tag receiving hopper positioned directly above the slide 69, this hopper being closed by a front tag retaining member 383 mounted in a bracket 384 secured to the frame of the tag feeding mechanism by screws 386. The front tag retaining member 383 has a rear dovetail portion 387 sliding in grooves 388 in upper and lower web members 389 and 391 (Figure 19) forming part of the bracket 384. The front tag retaining member 383 also has a forwardly extending portion 392 screw threadedly receiving an adjusting screw 393 journaled in bearings 394 and 395 in the web members 389 and 391, respectively. The adjusting screw 393 has an upper knurled member 397 secured thereto above the web 389 and a lower member 398 secured thereto below the bearing 395, the members 397 and 398 preventing vertical motion of the adjusting screw 393. Rotation of the adjusting screw 393 raises or lowers the front tag retaining member 383 with respect to the slide 69 so as to provide an adjustable space 399 between the tag retaining member 383 and slide 69. A compression spring 400 is positioned between the bearing 394 and the portion 392 of the tag retaining member 383, to assist in holding the tag retaining member 383 in adjusted position. Thus, turning screw 393 by the knurled member 397 enables the front tag retaining member 383 to be adjusted so as to allow a single tag at a time to be carried out of the tag magazine on the slide 69.

To feed tags from the tag magazine, the slide 69 is retracted from its position shown in Figure 19 by means of the cam B operating through the cam follower roller 323, crank arm 322, sector gears 314, 312 and 311 and rack 309. After the slide 69 has been retracted, the valve 334 is rotated to the position shown in Figure 20 through valve stem 347, sleeve 349 (Figure 18), crank arm 354, link 357, lever 361 and cam M to admit vacuum into the groove 328 of the slide 69 (Figure 20) and cause adherence of a tag to the slide 69. The slide is then projected to the position shown in Figure 19 by reason of rotation of the cam B to carry a tag from the stack 371 through the space 399. As above described, this places the end of the tag 68 in position to be received between the tag support 55 and tag clamp 56 (Figures 8 and 33). In this position, a downward extension 401 on the lower member 398 secured to the adjusting screw 393 (Figure 19) assists in maintaining the rear end of the tag 68 upon the tag slide 69.

After the tag has been fed to the position shown in Figures 8 and 33 and operated upon by the hook described above to perforate the tag and pull the ends of the cord loop therethrough, the entire tag feeding mechanism is moved to the right in Figures 16 and 18 to carry the end of the tag to the tag waxing mechanism. This is accomplished by cam C engaging a cam follower roller 402 carried by a bracket 403 secured to the side of the frame 293 of the tag feeding mechanism. The tag feeding mechanism is urged toward the left in Figures 16 and 18 so as to hold the cam follower roller 402 against the cam C by a compression spring 404 shown in Figures 16 and 1. Spring 404 has one end engaging the side of the frame 293 of the tag feeding mechanism and the other end engaging a bracket 406 secured to the top frame member 37, a rod 407 extending through the spring 404 and the bracket 406 to act as a guide for the spring 404. As most clearly shown in Figures 19 and 20, the top frame member 37 has an aperture 408 therein below the tag feeding mechanism of sufficient size to allow movement of the flexible vacuum conduit 336 both longitudinally of the tag feeding mechanism due to operation of the slide 69 and to lateral reciprocation of the tag feeding mechanism to carry the tag to the wax applying mechanism. This aperture 408 also provides room for the link 357 which forms part of the operating mechanism of the vacuum valve 334, the link 357 being of sufficient length to enable lateral reciprocation of the tag feeding mechanism without appreciably disturbing the position of the valve 334.

*Wax applying mechanism*

The details of the wax applying mechanism are most clearly shown in Figures 4 and 25 to 28, inclusive. This wax applying mechanism includes a wax pot 409 mounted upon a bracket 411 in turn secured to the upper frame member 37. The wax pot 409 has an integral offset portion 412 (Figure 28) containing an electrical heating unit 413, provided with suitable electrical terminals 414, for supplying heat to wax in the wax pot 409 in order to maintain wax contained therein in molten condition. The lower portion of the wax pot 409 is provided with a wax feeding opening 416 registering with the wax carrying aperture 73 in the wax slide 71 when the wax slide is in retracted position, the wax slide 71 being held against lower surfaces of the wax pot 409 by guide members 419 and 420. The guide members 419 and 420 are spring pressed upwardly by springs 421 surrounding studs 422 threaded into the lower surface of the wax pot 409. The lower surface of the wax pot 409 has a recess 423 between the guide members 419 and 420 to provide clearance for a stud 424 extending through an aperture in the wax slide 71 for actuating the wax slide. The stud 424 is screw threaded into a cross-head 426 having a lower portion 427 (Figure 27) received in a way 428 in the bracket 411, the way 428 being partially closed to retain the cross-head 426 in position by guide plates 429 secured to the bracket 428.

The cross-head 426 is reciprocated to reciprocate the wax slide 71 by mechanism most clearly shown in Figures 26 and 27. Thus, the cross-head 426 is provided with a roller 431 received in a fork 432 forming the upper end of a lever 433 pivoted to the bracket 411 at 434, the lever having a lower end pivoted to a link 436 at 437. The link 436 has its other end pivoted to the lower end of a lever 438 at 439 (Figure 25), the lever 438 being pivoted intermediate its ends to a bracket 440 secured to the upper frame member 37. The lever 438 carries a cam follower roller 441 (Figure 26) engaging a cam K on the cam shaft 138. The cam follower roller 441 is urged against the cam by means of a spring 442 connected between the lower portion of the lever 433 and a bracket 443 secured to the lower surface of the upper frame member 37. The spring 442 operating through the lever 433 and cross-head 426 retains the wax slide in the position shown in Figures 26 and 28 so that the cam K operating through the cam follower roller 441, lever 438, link 436, lever 433 and cross-head 426 will project the slide from the position shown in Figure 28 to an extended position in which the wax carrying aperture 73 is positioned directly below the wax stamp 77 carried on the arm 78 pivoted to the wax pot 409 at 446 (Figures 26 and 27). Molten wax is carried as a membrane in the aperture 73 in the wax slide 71 to a position above the end of the tag 68 shown in dot-dash lines in Figure 28.

The wax stamp anvil 74 pivoted to the bracket 411 at 75 forms a support for the tag 68 during operation of the wax stamp 77. Since the tag slide 69 has a portion which, as the result of reciprocation of the tag feeding mechanism, passes through the position occupied by the wax stamp anvil 74 during the wax applying operation, the wax stamp anvil 74 must be lowered out of the way of the tag slide 69 during reciprocation of the tag feeding mechanism. This is accomplished by causing the wax slide mechanism to lower the wax stamp anvil. Thus, an arm 447 (Figure 28) integral with the wax stamp anvil 74 may be pivotally connected to a link 448 at 449, the link 448 having its other end pivotally connected to the cross-head 427 at 451. As the wax slide 71 is moved to its wax applying position, the anvil is raised into contact with the tag 68 and when the wax slide 71 is retracted to wax receiving position shown in Figure 28, the wax stamp anvil 74 is lowered to provide clearance for the tag slide 69.

The wax stamp 77 is actuated through an arm 452 (Figure 26) which may be integral with the wax stamp arm 78 to form a bell crank. The arm 452 is pivoted to a link 453 at 454, the other end of the link 453 being pivotally connected to a lever 456 at 457. The lever 457 is pivoted intermediate its ends on the bracket 440 and carries a cam follower roller 459 at its upper end, the roller 459 engaging a cam L on the cam shaft 138. The cam follower roller 459 is urged against the cam L by means of a spring 460 having one end connected to the lower portion of the arm 452 and its other end connected to the bracket 443. The spring 460 operating through the arm 452 and arm 78 retains the wax stamp 77 in the position shown in Figure 26 and the cam L operating through the cam follower roller 459, lever 456, link 453 and wax stam arms 452 and 78 will depress the wax stamp 77 to apply wax to the tag 68 from the aperture 73 in the wax slide 71. The wax slide 71, wax stamp anvil 74 and wax stamp 77 are actuated substantially simultaneously by the cams K and L to furnish molten wax to the upper surfaces of the tag 68 and stamp the wax upon the tag, thus sealing the ends of the cord loop to the tag. The face of the wax stamp may carry any desired indicia or insignia which is embossed upon the wax seal in order to make the duplication of the seal by customers practically impossible.

*Cord feeding mechanism*

Figure 4:
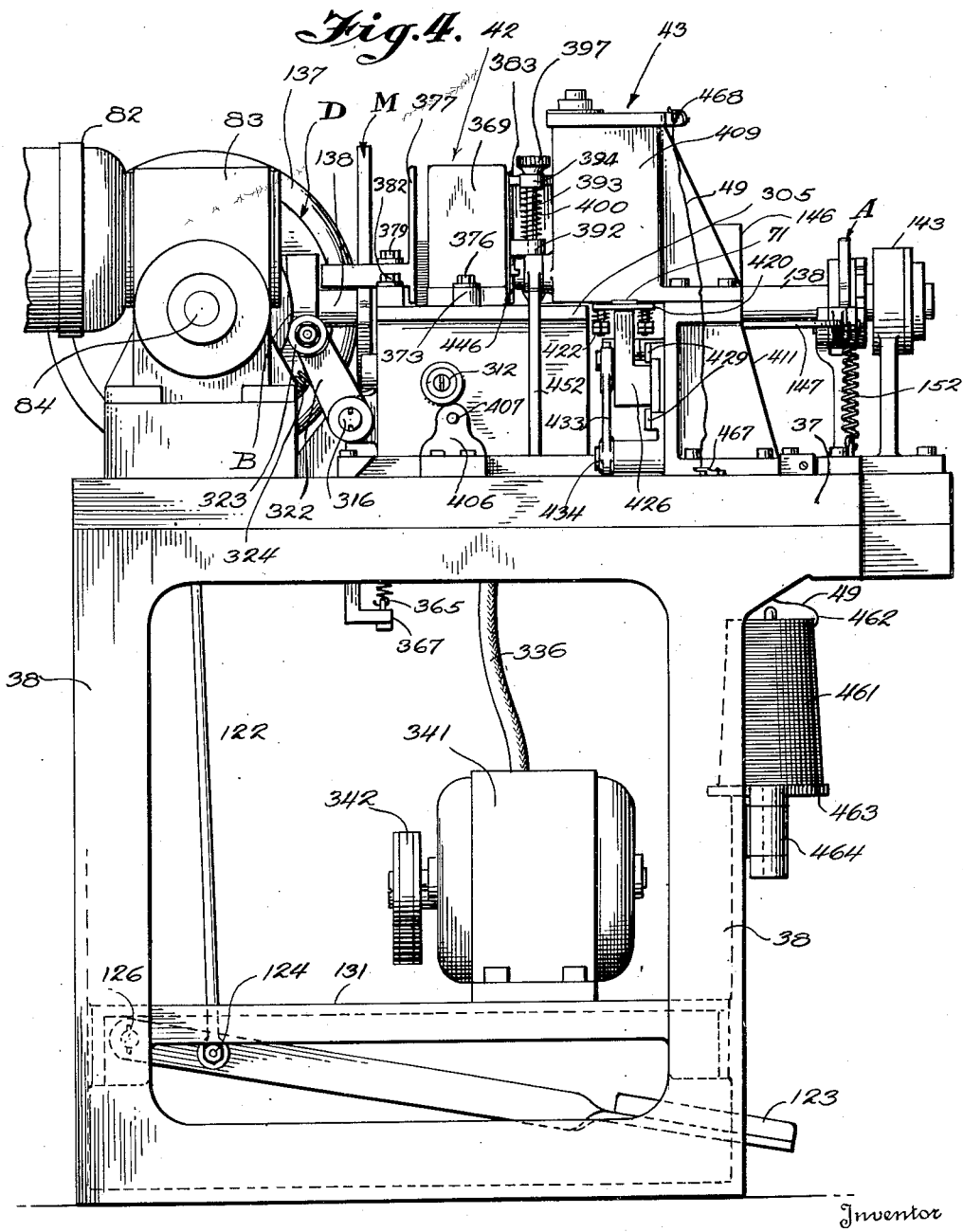
Figure 4 is a front elevation of the machine.
Figure 5:
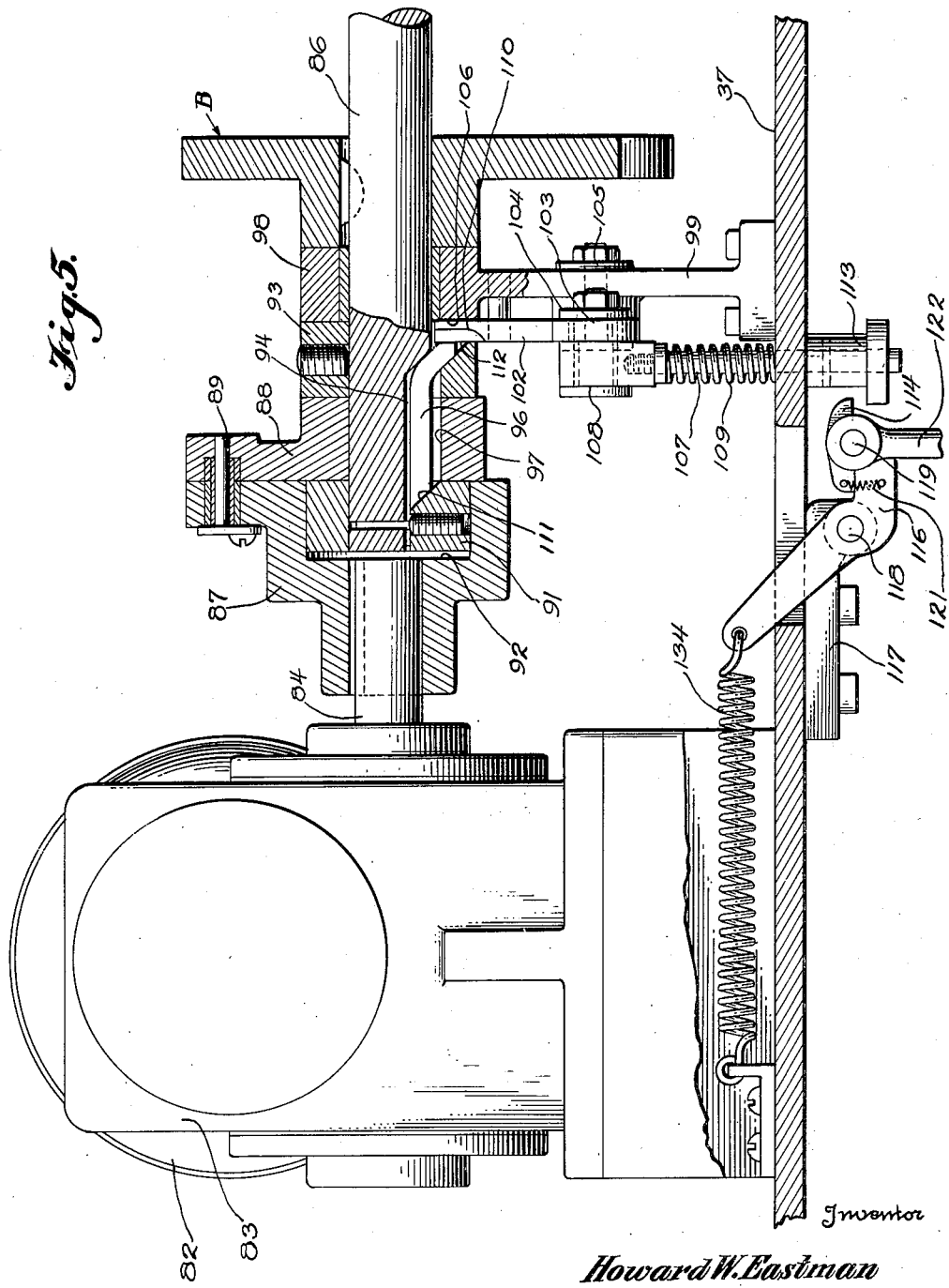
Figure 5 is an elevation partly in vertical section through the main shaft of the machine, the section being taken on the line 5—5 of Figure 1.

The cord from which the tag attaching loops are formed may be supplied to the machine from any suitable ball or cop, for example, the cop 461 shown in Figures 3 and 4. The cop 461 may be mounted upon a spindle 462 carried on a swinging bracket 463 hinged to a side frame member 38 at 464. The cord 49 may pass upwardly through a guide 465 secured to the bracket 463 and then through an aperture 466 (Figure 1) in the upper frame member 37. A suitable cord guide 467 may be secured to the frame 37 so as to guide the cord 49 through the aperture 466. The cord 49 may then be threaded through a pair of cord guides 468 and 469 mounted on the wax pot 409, the guide 469 being positioned so that the cord can then be carried directly to the cord guide 52 mounted on the knife guide 53 (Figure 15) in alignment with the eye of the needle 44.

Operation

The operation of the machine is best followed from the cam time chart shown in Figure 29, the zero position of the various cams when the machine is idle being shown at the left in Figure 29. The first operation by the operator is to position an article of fabric or other materials between the work clamp 47 and the work table 46 (Figures 1, 2 and 30). The operator then starts the machine by depressing the actuating pedal 123 (Figures 3 and 4). This trips the one revolution clutch shown in Figure 5 through the operating rod 122 to connect the driven shaft 84 with the main shaft 86 to cause the main shaft 86 to rotate through one revolution only. The main shaft 86 of the machine drives the cam shaft 138 (Figure 1) through the beveled gears 139 and 141 to also cause the cam shaft 138 to turn through one revolution only. An entire tag applying operation is carried out during this one revolution of the main shaft 86 and cam shaft 138.

As soon as the cam shaft 138 begins to operate, the work clamp cam A allows the work clamp 47 to be closed by the spring 152 (Figures 1 and 3). Immediately thereafter, the cam E allows the spring 196 (Figure 11) to move the needle 44 upwardly through the slots 62 and 61 in the work table 46 and work clamp 47, respectively, to thread the cord 49 through the article 59 (Figure 31) held between the work table and work clamp. The cord end 64 (Figure 31) is thereby carried through the material 59 into the cord gripper 48. The cord gripper is then closed by spring 227 (Figure 11) under control of cam F to grip the end of the cord in the slot 213 between the head portion 212 and the guide 209 of the cord gripper. After the cord has been gripped in the cord gripper, the cam E returns the needle to its lowermost position shown in Figure 11. When the spring member 51 on the needle lever 45 engages the work table 46 as shown in Figure 31, the latch 203 (Figure 11) engages over the projection 201 to hold the spring member 51 in the position shown in Figure 11 so that the cord can run freely through the eye 50 of the needle 44.

As soon as the needle has been returned to its lowermost position, the cam D (Figure 6) begins to move the sliding carriage 40 (Figure 1) from a position at the right to the position shown in Figure 1. This is accomplished through cam follower roller 173 (Figure 6) operating through levers 168 and 167 and links 163 and 164 (Figure 12) against compression springs 174 surrounding the rod 175. During this movement of the carriage 40, the tag support cam G and tag clamp cam H cause the tag support 55 and tag clamp 56 to approach each other. Thus, the cam G (Figure 8) engaging the cam follower roller 234 rotates the tag support lever 231 in a clockwise direction about its pivot 232 against the action of the spring 235 and the cam H engaging the cam follower roller 241 allows the spring 242 to rotate the tag clamp arm 238 in a counterclockwise direction about its pivot 239.

A tag feeding operation has been taking place during the operation described above. Thus, the valve cam M (Figure 18) allows opening of the vacuum valve 334 (Figure 20) by the spring 365 (Figure 18) through the valve stem 374 (Figure 21), sleeve 353 and crank arm 354 thereon, link 357 (Figure 18) and lever 361 under control of the cam follower roller 364 engaging cam M. As shown in Figure 29, opening of the vacuum valve to produce a vacuum within the groove 328 of the tag slide 69 (Figure 20) occurs almost immediately after the machine starts. This causes a tag 68 of the tag stack 371 (Figure 19) in the tag magazine to become fixed to the top of the tag slide 69. Shortly thereafter, the tag slide cam B advances the tag slide to the position shown in Figure 19 carrying a tag 68 therewith through the opening 399 underneath the front tag retaining member 383. Advancement of the tag slide 69 is accomplished through the rack 309, segmental gears 311, 312 and 314, shaft 316 and lever 322 by the spring 324 under control of the cam follower roller 323 engaging cam B. The tag is thus in position to be clamped between the tag support 55 and tag clamp 56 (Figure 8) when the carriage reaches the position shown in Figure 1.

During movement of the carriage from right to left in Figure 1, the cord loop is formed and is picked up by the tag support 55 (Figure 32) so that the two sides thereof are in the transverse groove 67 of the tag support 55 as shown in Figure 33. The hook 57 under control of hook cam I follows the tag clamp 56 downwardly and when the tag has been clamped thereby, the hook perforates the tag 68 to reach the position shown in Figure 8. The hook 57 attached to the hook lever 58 is moved downwardly by the cam I engaging the cam follower roller 249 to rotate the hook lever 58 in a counterclockwise direction in Figure 8 against the action of compression spring 251. The cam I then allows the spring 251 (Figure 8) to rotate the hook lever 58 in the opposite direction to carry the hook 57 upwardly. The hook picks up the two sides of the loop of the cord 49 to pull them upwardly through the perforation in the tag 68.

Referring to Figure 29, it will be noted that the cord gripper 48 opens at about the time the hook starts upwardly and also that the knife cam J operates the knife to cut the cord, thus providing a cord loop with two free ends which can be pulled through the perforation in the tag 68 by the hook 57. The cord gripper is opened by the cam F (Figure 11) engaging the cam follower roller 266 to move the cord gripping element 211 to open position against the action of spring 277. The knife is operated by cam J (Figure 15) engaging cam follower roller 282 to rotate the bell crank made up of arms 281 and 278 to thus advance the sliding rod 273 against the spring 283, the sliding rod 273 having the knife 54 secured thereto. Figure 33 shows how the cord 49 extends through the notch 266 (Figure 13) in the knife engaging member 265 so that projection of the knife 54 by the cam J cuts the cord 49. The knife is then immediately retracted by action of the spring 283. Projection of the knife to cut the cord also causes the latch tripping member 288 (Figure 15) secured to the sliding rod 273 to engage the latch member 203 and release the spring member 51 to hold the cut end of the cord 64' in the eye 50 of the needle 44 (Figure 34).

The tag clamp 56 (Figure 8) and tag support 55 are then separated as indicated in Figure 29 under control of their respective cams H and G to release the tag 68. Thus, the spring 235 (Figure 8) rotates the tag support lever 231 in a counterclockwise direction in Figure 8 under control of the cam follower roller 234 engaging the cam G and the cam H engages the cam follower roller 241 to rotate the tag clamp lever 238 in a clockwise direction against the action of spring 242. This releases the tag from the tag support and tag clamp, the tag still being held by vacuum action upon the upper surface of the tag slide 69.

As soon as the tag is released by the tag clamp 56 and tag support 55, the tag feeding mechanism is moved transversely by the cam C (Figure 18) to move the tag to wax applying position. That is to say, the cam C in engagement with the cam follower roller 402 pushes the entire tag feeding mechanism to the right in Figure 18 against the action of the spring 204 shown in Figures 1 and 16. This carries the tag with the cord loop ends pulled therethrough to wax applying position as indicated in Figure 35.

During the latter portion of the transverse movement of the tag feeding mechanism, the wax feed cam K (Figure 26) starts to move the wax slide 71 from its position shown in Figure 28 to an extended position in which the wax carrying aperture 73 is directly under the wax stamp 77. The wax slide 71 is moved by the crosshead 426 which in turn is moved by the lever 433 (Figure 26) engaging the roller 431 on the cross-head 426. The wax slide is held in its position shown in Figure 26 by the spring 442 and is projected to wax applying position by the cam K engaging the cam follower roller 441 on the lever 438 which is connected to the lever 433 through the link 436 (Figure 24). Movement of the cross-head 426 to carry the wax slide 71 to wax applying position also rotates the wax stamp anvil 74 (Figure 26) into operative position through the link 448 and arm 447 integral with the wax stamp anvil 74.

As indicated in Figure 29, the cam L operates the wax stamp 77 (Figure 26) substantially simultaneously with the operation of the wax slide 71 and wax stamp anvil 74 by cam K so that molten wax carried over the tag 68 in the aperture 73 of the wax slide is stamped onto the tag 68. The wax stamp is operated from the cam L (Figure 26) by engagement of this cam with the cam follower roller 459 to rock the lever 456 and thus rock the wax stamp arm 78 through the link 453 and lever arm 452. The cams K and L have substantially no dwells as indicated in Figure 29 so that the wax stamp 77, wax slide 71 and wax stamp anvil 74 are immediately returned to their position shown in Figure 26 by the springs 460 and 442, respectively, (Figure 26).

As soon as the waxing operation has been completed, the vacuum valve is actuated by the spring 365 (Figure 18) under control of the cam M to disconnect the groove 328 (Figure 20) in the slide 69 from the vacuum conduit 336 and open it to the atmosphere, thus releasing the tag from the tag slide 69. As indicated in Figure 29, the carriage 40 has already started to move to the right in Figure 1 by action of springs 174 (Figure 6) under control of cam D so as to be in position for the needle to again thread the cord through another piece of material. Immediately after the tag is released from the tag slide 69, the work clamp cam A opens the work clamp so that the work clamp again assumes the position shown in Figures 3 and 30. The tag feeding mechanism is then returned to its original position by the spring 404 (Figures 1 and 16) under control of cam C and the tag slide 69 is simultaneously retracted by cam B (Figure 19) against the action of spring 324.

The work with the tag attached can then be removed from between the work clamp 47 and the work table 46, the two sides of the cord loop sliding out of the slot 61 in the work clamp and out of the slots 62 and 81 in the work table. The machine then stops in condition for the insertion of another article to be tagged and the operation above described can be repeated by again depressing the starting pedal 123 of Figures 3 and 4.

It will thus be seen that I have provided a completely automatic machine which requires only the insertion of an article to be tagged and the depression of a starting pedal. The machine holds the work against removal during operation of the machine; threads a cord through the article to be tagged; forms a loop in the cord; and cuts the cord to provide free ends on the loop. During this operation, a tag is fed and clamped into position to be perforated by a hook which pulls the free ends of the loop through the perforation in the tag after which molten wax is applied to the tag and stamped to form a seal for the free ends of the cord loop. The machine then releases the article and tag so that the article can be removed from the machine by the operator with a tag sealed thereto, the machine then being in condition to receive another article to be tagged.

While I have described the preferred embodiment of my invention, it is understood that the details thereof may be varied within the scope of the following claims.

I claim:

1. The method of securing a tag to an article, which comprises, passing the end of a cord through an aperture in said article, forming a loop in said cord having a portion extending through said aperture and having end portions, passing the end portions of said loop through a perforation in a tag and securing the ends of said loop to said tag adjacent to said perforation with an embossed wax seal.

2. The method of securing a tag to an article, which comprises, passing the end of a cord through a perforation in said article from one side thereof, pulling said cord end through said article and back adjacent the portion of the cord on the said one side of the article to form a loop, releasing said cord end and severing said portion of the cord to provide another cord end, pulling the cord ends through a perforation in said tag and thereafter sealing said cord ends to said tag with an embossed wax seal.

3. The method of securing a tag to an article, which comprises, passing the end of a cord through a perforation in said article, forming a loop in said cord having a portion extending through said perforation and having end portions, passing the end portions of said loop through a perforation in a tag, applying molten sealing wax to the end portions of said cord and to said tag and stamping said wax to form an embossed wax seal which seals the ends of said cord to said tag.

4. The method of securing a tag to an article, which comprises, perforating said article and passing the end of a cord through the resulting perforation, forming a loop in said cord having a portion extending through said perforation and having end portions, perforating a tag and pulling the end portions of said loop through the perforation in said tag, applying molten sealing wax to the end portions of said loop and to said tag and stamping said wax to form an embossed wax seal which seals said loop ends to said tag.

5. The method of securing a tag to an article, which comprises, passing the end of a cord through a perforation in said article, forming a loop in said cord having a portion extending through said aperture and having end portions, passing the end portions of said loop through a perforation in said tag, supporting a membrane of molten sealing wax adjacent but spaced from said tag and said end portions, and stamping said membrane against said tag and end portions to emboss said wax and seal said end portions to said tag.

6. A device for attaching a tag to an article, which comprises, means for passing an end of a cord through an aperture in said article, means for forming a loop in said cord having a portion extending through said aperture and having end portions, means for feeding a tag into a position adjacent said end portions and means for securing said cord end portions to said tag including means for applying sealing wax to said tag and cord end portions and embossing said wax to seal said end portions to said tag.

7. A device for attaching a tag to an article, which comprises, means for passing the end of a cord through an aperture in said article, means for forming a loop in said cord having a portion extending through said aperture and having end portions, means for passing said end portions through a perforation in a tag and means for securing said cord end portions to said tag including means for applying sealing wax to said tag and cord end portions and embossing said wax to seal said end portions to said tag.

8. A device for attaching a tag to an article, which comprises, means for perforating said article and passing an end of the cord through the resulting perforation, means for thereafter gripping said end of said cord and pulling said cord through said perforation to form a loop in said cord having a portion passing through said perforation and having end portions, means for feeding a tag to a position adjacent said end portions, and means for securing said end portions to said tag including means for supplying sealing wax to said tag and end portions and means for embossing said wax to seal said end portions to said tag.

9. A device for attaching a tag to an article, which comprises, means for passing a cord through an aperture in said article, means for forming a loop in said cord having a portion extending through said article and having end portions, means for feeding a tag into a position adjacent said end portions and means for securing said cord end portions to said tag including means for perforating said tag and pulling said end portions of said loop through said perforation, and means for applying wax to said end portions and said tag and stamping the same to seal said end portions to said tag.

10. A device for attaching a tag to an article, which comprises, a needle having an eye adjacent its point for receiving an end of a cord, means for projecting the point of said needle through said article to perforate said article and carry said end of said cord through the resulting perforation and to thereafter retract said needle, a cord gripper positioned to receive and grip said end of said cord after passage of the same through said article by said needle, means for relatively moving said cord gripper and said article to pull said cord through said article and form a loop in said cord having a portion extending through said article and having adjacent end portions, means for feeding a tag to a position adjacent said end portions and means for securing said end portions to said tag including means for applying sealing wax to said tag and end portions and embossing said wax to seal said end portions to said tag.

11. A device for attaching a tag to an article, which comprises, clamping means for holding an article to be tagged, a needle having an eye adjacent its point for receiving an end of a cord, said clamping means having slots therein for enabling the point of said needle to be passed through said article, means for moving said needle to pass the point thereof through said article and carry said cord end through said article and thereafter retract said needle, means for gripping the end of said cord after said end has been passed through said article by said needle, means for relatively moving said gripping means and said clamping means to pull said cord through said article and form a loop therein having a portion extending through said article and having end portions, means for attaching said end portions to a tag, including means for holding said tag and means for applying molten wax to said cord ends and said tag and embossing said wax to seal said cord ends to said tag, and means for releasing said clamping means and said tag to enable said article to be removed from said device having a tag sealed thereto.

12. A device for attaching a tag to an article, which comprises, work clamping means for receiving and clamping said article in tag attaching position, a cord carrying needle having an eye therein for receiving a cord end, said work clamping means having slots therein to enable a portion of said needle to be passed through said article, means for moving said needle to carry the end of said cord through said article and to then retract said needle, a cord gripper positioned adjacent said work clamping means for receiving and gripping the end of said cord after said end has been passed through said article, said needle and said cord gripper being supported upon a movable member, means for moving said member relative to said work clamping means to move said cord gripper and needle and pull said cord through said article and the eye of said needle to form a loop in said cord, means for releasing said cord end and means for severing said cord adjacent said needle and between said needle and said work clamping means to provide said loop with two free ends and leave a new end of said cord in said eye, and means for feeding a tag to a position adjacent said free ends and for securing said free ends of said loop to said tag.

13. A device for attaching a tag to an article, which comprises, work clamping means for receiving and clamping a work piece in tag attaching position, a cord carrying needle having an eye therein for receiving the end of a cord, said work clamping means having slots therein to enable a portion of said needle to be passed through said article, means for moving said needle to carry said cord end through said article and then retract said needle, a cord gripper positioned adjacent said work clamping means for receiving and gripping the end of said cord after said end has been carried through said article by said needle, said needle and said cord gripper being supported upon a movable member, means for moving said member relative to said work clamping means to move said cord gripper and needle and pull said cord through said article and the eye of said needle to form a loop in said cord, means for releasing said cord end and for severing said cord adjacent said needle and between said needle and said work clamping means to provide said loop with two free ends and leave a new end of said cord in said eye, means for feeding a tag to a position adjacent said free ends and for securing said free ends to said tag, means for gripping the new end of said cord in the eye of said needle, means for returning said needle carrying said new end of said cord and said cord gripper to a position adjacent said work clamping means to condition said needle and said cord gripper for passing a cord through another article, and means for releasing said work clamping means to enable said cord with attached tag to be withdrawn from said device.

14. A device for attaching a tag to an article, which comprises, work clamping means for receiving and clamping a work piece in tag attaching position, a cord carrying needle having an eye adjacent its point for receiving an end of a cord, said work clamping means having openings therein to enable the point of said cord carrying needle to be passed through said article to carry said cord end through said article, a cord gripper positioned adjacent said work clamping means for receiving and gripping the end of said cord after said end has been passed through said article, means for retracting said needle to leave said cord end extending through said article, means for moving said cord gripper and needle away from said work clamping means to pull said cord through said article and the eye of said needle to form a loop in said cord, means for severing said cord adjacent said needle and between said needle and said work clamping means and for releasing said cord gripper to provide said loop with two free ends, means for feeding a tag to a position adjacent said free ends prior to severing said cord and releasing said cord gripper, means including a tag clamping device and a hook for pulling said free ends through an aperture in said tag, and means for sealing said free ends to said tag adjacent said aperture.

15. A device for attaching a tag to an article, which comprises, a needle having an eye adjacent its end for receiving an end of a cord, means for moving said needle to perforate said article and carry said end of said cord through the resulting perforation and to then retract said needle, a cord gripper positioned to receive and grip said end of said cord after passage of the same through said article, means for forming a loop in said cord having a portion extending through said article and having adjacent end portions including means for simultaneously moving said cord gripper and needle laterally away from said article to pull said cord through said article and said needle, means for severing said cord between said needle and said article to provide said loop with two free end portions, means for feeding a tag to a position adjacent said end portions and means for securing said end portions to said tag including means for supplying molten sealing wax to said tag and end portions and means for embossing said wax to seal said end portions to said tag.

16. A device for attaching a tag to an article, which comprises, a work support, work clamping means cooperating with said work support for receiving and clamping said article, means for forming a tag attaching loop including a cord carrying needle having an eye therein for receiving a cord adjacent its end, means for actuating said needle to perforate said article and carry said end of said cord therethrough and then retract said needle, a cord gripper positioned adjacent said work clamping means for receiving and gripping the end of said cord after said end has been passed through said article, said needle and said cord gripper being supported upon a movable member, means for moving said member to move said needle and said cord gripper away from said work clamping means to pull said cord through said article and the eye of said needle to form a loop in said cord, means for severing said cord adjacent said needle and between said needle and said work clamping means to provide said loop with two free ends, means for feeding a tag to a position adjacent said free ends, means for holding said tag and sealing said free ends to said tag, and means for releasing said work clamping means and said tag holding means to release said article from said device along with said tag attached to said article by said cord loop.

17. In a device for attaching tags to an article, means for passing an end of a cord through an aperture in said article and forming a loop in said cord having a portion extending through said aperture, said means including work clamping means for clamping said article in cord threading position, a carriage movable relative to said work clamping means, a cord end gripper and a needle having a cord carrying eye adjacent its point mounted on said carriage, said needle and gripper being supported upon opposite sides of an article in said work clamping means in one position of said carriage, means for projecting the point of said needle through said article in said work clamping means to pass the end of said cord through said article and into said cord end gripper, means for closing said cord gripper to grip the end of said cord, means for retracting said needle to leave said cord extending through said article, means for moving said carriage to a second position to move said needle and cord end gripper away from said work clamping means and pull said cord through said article and needle eye to form said loop in said cord, means for severing said cord adjacent said needle and means for securing the resulting ends of the loop to a tag.

18. A device for attaching a tag to an article, which comprises, clamping means for holding an article to be tagged, a needle having an eye adjacent its end for receiving an end of a cord, said clamping means having slots therein for enabling the end of said needle to be passed through said article, means for moving said needle to pass the end thereof through said article and carry said cord end through said article and thereafter retract said needle, means for gripping the end of said cord after the same has been passed through said article by said needle, means for relatively moving said gripping means and said clamping means to pull said cord through said article and form a loop therein having a portion extending through said article and having end portions, means for attaching said end portions to a tag including means for feeding a tag to a tag perforating position, means including a hook for perforating said tag at said position and pulling said end portions of said loop through said tag, means for moving said tag feeding means to move said tag with said end portions of said loop extending through said tag to a wax applying position, means for applying molten wax to said cord ends and said tag and for embossing said wax to seal said cord ends to said tag, means for releasing said clamping means and means for releasing said tag from said tag feeding means to enable said article to be removed from said device with a tag attached and sealed thereto.

19. A device for attaching a tag to an article, which comprises, means for passing a cord through an aperture in said article, means for forming a loop in said cord having a portion extending through said article and having end portions, means for feeding a tag into a position adjacent said end portions, means for perforating said tag and pulling said end portions of said loop through said perforation, said last named means including means for clamping said tag, hook means, and means for moving said hook means through said tag in said clamping means into engagement with said end portions of said loop and for retracting said hook, and means for sealing said ends to said tag.

20. A device for attaching a tag to an article, which comprises, means for passing a cord through an aperture in said article, means for forming a loop in said cord having a portion extending through said article and having end portions, means for feeding a tag into a position adjacent said end portions, means for perforating said tag and pulling said end portions of said loop through said perforation, said last named means including means for clamping said tag, hook means, and means for moving said hook means through said tag in said clamping means into engagement with said end portions of said loop and for retracting said hook, means for moving said tag having said end portions extending therethrough to a wax applying position, and means for applying sealing wax to said tag and said cord end portions and stamping said wax to seal said cord end portions to said tag.

21. A device for attaching a tag to an article, which comprises, means for forming a loop in a cord having a portion passing through said article and having end portions, means for feeding a tag to a position adjacent said end portions including a tag magazine for receiving a plurality of tags, a tag slide reciprocable along the surface of a tag in said magazine from a tag receiving position to a cord attaching position, vacuum means associated with said slide for securing a tag to said slide in said tag receiving position, and means for reciprocating said slide to carry said last mentioned tag to said cord attaching position, and means for securing said end portions to said last mentioned tag including means for applying sealing wax to said last mentioned tag and end portions and means for embossing said wax to seal said end portions to said last mentioned tag.

22. A device for attaching a tag to an article, which comprises, means for forming a loop in a cord having a portion passing through said article and having end portions, means for feeding a tag to a position adjacent said end portions including a tag magazine for receiving a plurality of tags, a tag slide reciprocable along the surface of a tag in said magazine from a tag receiving position to a cord attaching position, vacuum means associated with said slide for securing a tag to said slide in said tag receiving position, and means for reciprocating said slide to carry said last mentioned tag to said cord attaching position, and means for securing said end portions to said last mentioned tag including means for pulling the end portions of said loop through an aperture in said last mentioned tag, means for moving said slide carrying said last mentioned tag to a wax applying position, means for applying sealing wax to said last mentioned tag and end portions and means for embossing said wax to seal said end portions to said last mentioned tag.

23. A device for attaching a tag to an article, which comprises, means for passing a cord through an aperture in said article, means for forming a loop in said cord having a portion extending through said article and having end portions, means for feeding a tag into a position adjacent said end portions and means for securing said cord end portions to said tag including means for perforating said tag and pulling said end portions of said loop through said perforation, and means for applying wax to said end portions and said tag and stamping the same to seal said end portions to said tag, said last named means including a wax reservoir, means for heating said wax in said reservoir to maintain the same in molten condition, a wax slide extending below said reservoir, said wax slide having a wax carrying aperture extending therethrough and communicating at one side of said slide with a conduit from said reservoir in one position of said slide, a member on the other side of said slide to close said aperture and prevent leakage of wax from said reservoir through said aperture, means for moving said slide to position said wax carrying aperture adjacent said tag, wax stamp means, and means for moving said wax stamp means through said aperture against said tag and said cord end portions to apply wax to and seal said end portions to said tag.

24. A device for attaching a tag to an article, which comprises, means for passing an end of a cord through said article and forming a loop in said cord having a portion passing through said article and having end portions, means for feeding a tag into position adjacent said end portions, means for attaching said end portions to said tag including a wax slide having an aperture therein, a reservoir for molten wax communicating with said aperture in one position of said slide to fill said aperture with molten wax, means for moving said slide to another position to carry said aperture containing said molten wax to a position adjacent said tag and said cord ends, a wax stamp, and means for moving said wax stamp through said aperture against said tag and said cord ends to apply said wax to said tag and cord ends and form an embossed seal securing said cord ends to said tag.

25. A device for attaching a tag to an article, which comprises, means for passing an end of a cord through said article and forming a loop in said cord having a portion passing through said article and having end portions, means for feeding a tag into position adjacent said end portions, means for attaching said end portions to said tag including a wax carrier having an aperture therein, a reservoir for molten wax communicating with said aperture in one position of said carrier to fill said aperture with molten wax, means for moving said carrier to another position to carry said aperture containing said molten wax to a position adjacent said tag and said cord ends, a wax stamp, and means for moving said wax stamp through said aperture against said tag and said cord ends to apply said wax to said tag and cord ends and form an embossed seal securing said cord ends to said tag.

26. In a device for forming seals, a wax carrier movable between a wax receiving position and a wax applying position, said carrier having an aperture therethrough, a reservoir for molten wax communicating with said aperture when said carrier is in its wax receiving position to fill said aperture with molten wax, means for moving said carrier to move said aperture containing said molten wax to wax applying position, a wax stamp, and means for moving said wax stamp through said aperture against an article to be sealed to apply said wax to said article and form an embossed seal thereon.

27. In a device for forming seals, a wax carrier movable between a wax receiving position and a wax applying position, said carrier having an aperture therethrough, a wax container, heating means for maintaining wax in said container in molten condition, said container having a conduit communicating with one side of said aperture when said carrier is in its wax receiving position to fill said aperture with wax, means for closing the other side of said aperture when said carrier is in wax receiving position to prevent leakage of said wax, means for moving said carrier to carry a membrane of wax in said aperture to a wax applying position, said carrier closing said conduit when said carrier is in wax applying position, and wax stamping means movable through said aperture against an article to be sealed to apply and stamp said wax on said article.

28. In a device for forming seals, a wax carrier movable between a wax receiving position and a wax applying position, said carrier having an aperture therethrough, a reservoir for molten wax communicating with said aperture when said carrier is in its wax receiving position to fill said aperture with molten wax, means for moving said carrier to move said aperture containing said molten wax to wax applying position, means for holding an article to be sealed with a surface adjacent one side of said wax carrier, wax stamping means on the other side of said carrier and movable through said aperture against said surface, and means for moving said stamping means through said aperture to stamp wax from said aperture upon said surface.

29. The method of securing a tag to an article, which comprises, clamping said article at an article threading station, threading a free end of a cord through said article at said station by passing through said clamped article a pointed end of a needle having said free end of said cord threaded through an eye adjacent said pointed end, gripping said free end after the same has been passed through said article, withdrawing said needle from said article, moving said needle and the gripped end of said cord laterally from said station past a tag threading station to pull a loop in said cord which extends through said article, delivering a tag to said tag threading station, passing a hooked member through said tag so as to engage said cord both adjacent said needle and adjacent said gripped end of said cord, withdrawing said hooked member from said tag while releasing said gripped end, and severing said cord adjacent said needle to pull the resulting two free ends of said cord through said tag, moving said tag having said resulting free ends extending therethrough from said tag threading station to a waxing station, forming a membrane of molten wax in an aperture in a wax feeding member and positioning said membrane adjacent said tag and said resulting free ends and moving a wax stamp through said aperture and against said tag and resulting free ends to secure said resulting free ends of said cord to said tag with an embossed wax seal.

HOWARD W. EASTMAN.

REFERENCES CITED

The following references are of record in the file of this patent:

UNITED STATES PATENTS

| Number | Name | Date |
| --- | --- | --- |
| 2,052,023 | Griesinger | Aug. 25, 1936 |
| 2,063,917 | Flood | Dec. 15, 1936 |
| 2,063,918 | Flood | Dec. 15, 1936 |
| 2,207,913 | Dalton | July 16, 1940 |
| 2,304,908 | Golden | Dec. 15, 1942 |